US012659839B2

(12) United States Patent
Zhou et al.

(10) Patent No.: US 12,659,839 B2
(45) Date of Patent: Jun. 16, 2026

(54) WIRELESS COMMUNICATION METHOD, STATION DEVICE AND ACCESS POINT DEVICE

(71) Applicant: GUANGDONG OPPO MOBILE TELECOMMUNICATIONS CORP., LTD., Dongguan (CN)

(72) Inventors: Pei Zhou, Dongguan (CN); Lei Huang, Singapore (SG); Liuming Lu, Dongguan (CN); Chaoming Luo, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 329 days.

(21) Appl. No.: 18/374,798

(22) Filed: Sep. 29, 2023

(65) Prior Publication Data

US 2024/0023003 A1     Jan. 18, 2024

Related U.S. Application Data

(63) Continuation of application No. PCT/CN2021/085416, filed on Apr. 2, 2021.

(51) Int. Cl.
*H04W 48/08* (2009.01)
*H04W 84/12* (2009.01)

(52) U.S. Cl.
CPC ............ *H04W 48/08* (2013.01); *H04W 84/12* (2013.01)

(58) Field of Classification Search
None
See application file for complete search history.

(56) References Cited

U.S. PATENT DOCUMENTS 12,244,356 B2 *  3/2025  Wei ........................ H04L 5/0044
2019/0132762 A1   5/2019  Zhu et al.
(Continued)

FOREIGN PATENT DOCUMENTS

CN      103873216 A    6/2014
CN      110891296 A    3/2020
(Continued)

OTHER PUBLICATIONS

International Search Report and Written Opinion dated Dec. 13, 2021 in International Application No. PCT/CN2021/085416. English translation attached.

(Continued)

*Primary Examiner* — Hong S Cho
(74) *Attorney, Agent, or Firm* — Sheppard, Mullin, Richter & Hampton LLP

(57) ABSTRACT

The embodiments of the present disclosure provide a wireless communication method, a station device, and an access point device. The method comprises transmitting, by a Master Access Point (MAP) device, first information. The first information comprises common Access Point (AP) group information, the common AP group information comprising identifiers of a plurality of AP groups, each of the plurality of AP groups comprising one or more APs; or the first information comprises identifiers of APs or an identifier of an AP group for multi-AP coordinated transmission with a Station (STA) device.

20 Claims, 22 Drawing Sheets

(56) References Cited

U.S. PATENT DOCUMENTS

2020/0076551 A1 *   3/2020   Cherian ............ H04W 74/0808
2020/0245238 A1 *   7/2020   Kim ...................... H04W 76/11

FOREIGN PATENT DOCUMENTS

WO           2020091412  A1      5/2020
WO           2020111822  A1      6/2020

OTHER PUBLICATIONS

Park, Sungjin et al. LG Electronics, "Setup for Multi-AP coordination" doc.: IEEE 802.11-19/1895r2, Jan. 16, 2020, Nov. 2019, section 2.1.2, 15 pages.
LiNan et al. ZTE Corporation, "Consideration on Multi-AP Coordination"doc.: IEEE 802.11-19/1129r2, Sep. 18, 2019, section 2.1.3, 9 pages.
Sun, Bo et al. ZTE Corporation, "Multi-AP Group Establishment" doc.: IEEE 802.11-19/1961r4, Jul. 15, 2020, 14 pages.
Deng. Cailian et al. IEEE 802.11be Wi-Fi 7: New Challenges and Opportunities IEEE Communications Surveys & Tutorials, vol. 22,No. 4, Jul. 29, 2020 (Jul. 29, 2020).ISSN: 1553-877X, entire document, 30 pages.
"IEEE P802.11be™/D1.0"Draft Standard for Information technology—Telecommunications and information exchange between systems Local and metropolitan area networks—Specific requirements, May 2021, 635 pages.

* cited by examiner

100
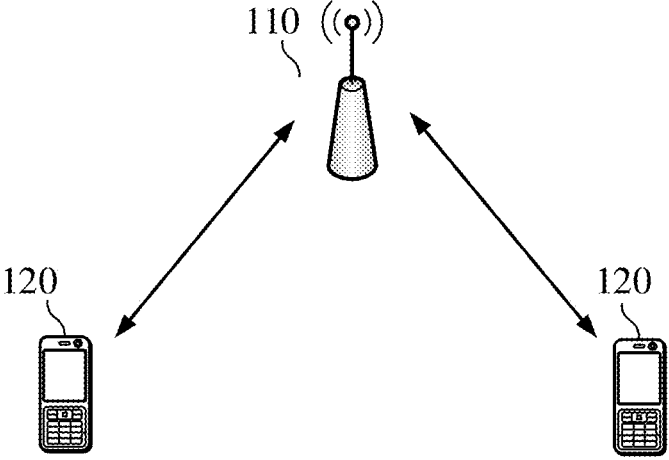
FIG. 1
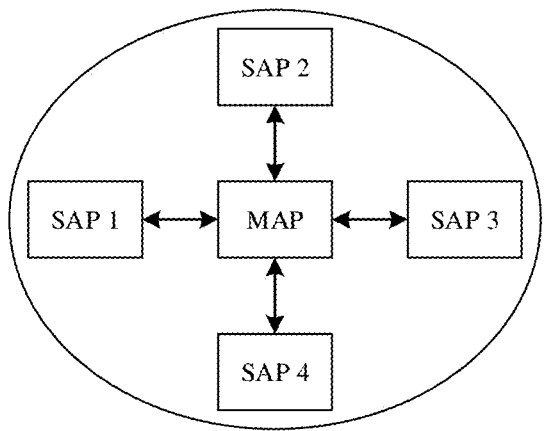
FIG. 2
FIG. 3

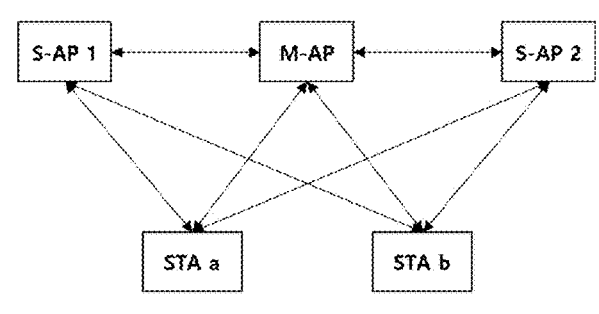
FIG. 4
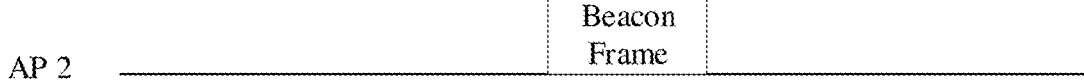
AP 1
AP 2
AP 3
FIG. 5
AP 1
(MAP)
Request
Frame
Request
Frame
Response
Frame
Response
Frame
AP 2
(SAP)
Beacon
Frame
Response
Frame
AP 3
(SAP)
Beacon
Frame
Response
Frame
FIG. 6

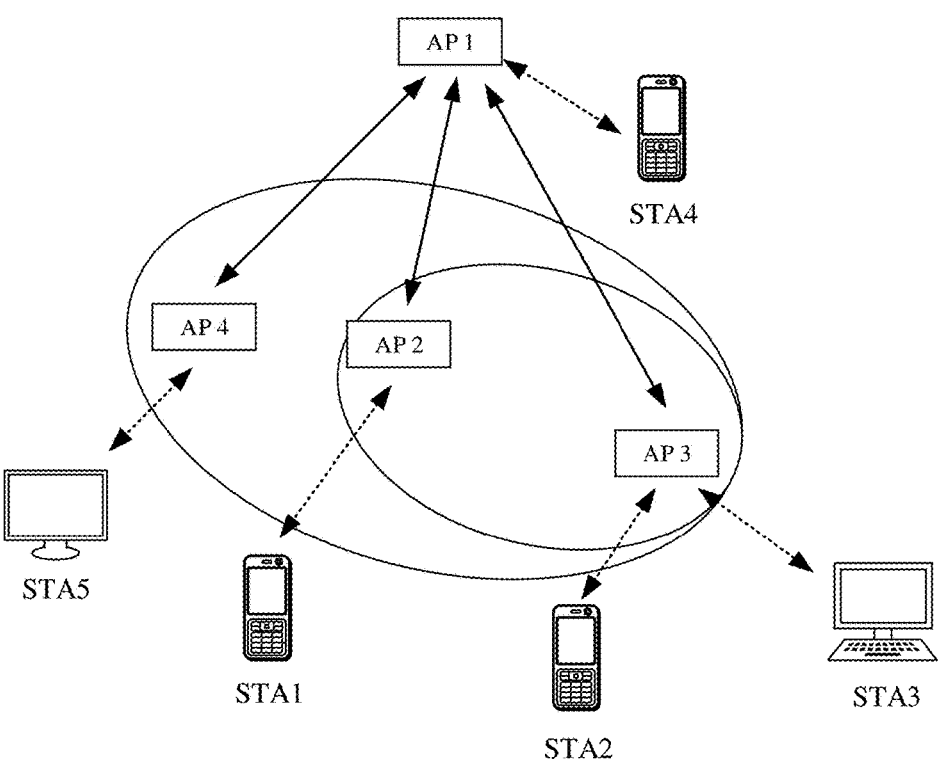

| STA Device | MAP Device | SAP Device |
|---|---|---|

S210: MAP device transmits first information, the first information including common AP group information, the common AP group information including identifiers of a plurality of AP groups, each of the plurality of AP groups including one or more APs; or the first information including identifiers of APs or an identifier of an AP group for multi-AP coordinated transmission with STA device S210: MAP device transmits first information, the first information including common AP group information, the common AP group information including identifiers of a plurality of AP groups, each of the plurality of AP groups including one or more APs; or the first information including identifiers of APs or an identifier of an AP group for multi-AP coordinated transmission with STA device S220: STA device receives the first information S220: SAP device receives the first information

FIG. 8

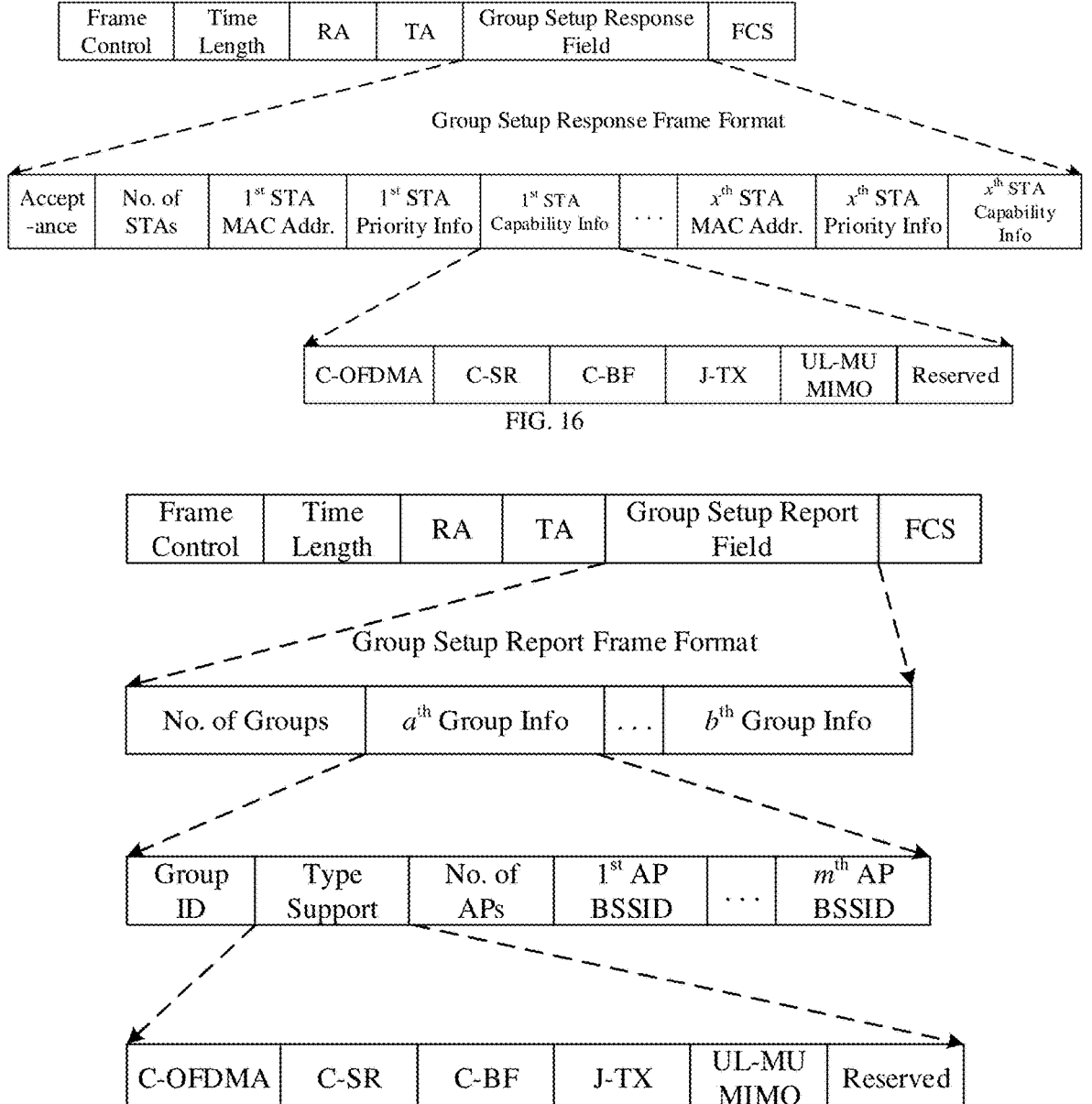

| Frame Control | Time Length | RA | TA | Group Setup Response Field | FCS |
|---|---|---|---|---|---|

Group Setup Response Frame Format

| Accept -ance | No. of STAs | 1st STA MAC Addr. | 1st STA Priority Info | 1st STA Capability Info | ... | $x^{th}$ STA MAC Addr. | $x^{th}$ STA Priority Info | $x^{th}$ STA Capability Info |
|---|---|---|---|---|---|---|---|---|

| C-OFDMA | C-SR | C-BF | J-TX | UL-MU MIMO | Reserved |
|---|---|---|---|---|---|

FIG. 16

| Frame Control | Time Length | RA | TA | Group Setup Report Field | FCS |
|---|---|---|---|---|---|

Group Setup Report Frame Format

| No. of Groups | $a^{th}$ Group Info | ... | $b^{th}$ Group Info |
|---|---|---|---|

| Group ID | Type Support | No. of APs | 1st AP BSSID | ... | $m^{th}$ AP BSSID |
|---|---|---|---|---|---|

| C-OFDMA | C-SR | C-BF | J-TX | UL-MU MIMO | Reserved |
|---|---|---|---|---|---|

FIG. 17

| Index | Info | Record |
|-------|------|--------|
| 1 | Capability Info | Capability Info Field |
| ... | ... | ... |
| x | Multi-AP Transmission Capability Info | |

| Element ID | Length | Multi-AP Transmission Capability Field |
|------------|--------|----------------------------------------|

Multi-AP Transmission Capability Element

| C-OFDMA | C-SR | C-BF | J-TX | UL-MU MIMO | Reserved |
|---------|------|------|------|-----------|----------|

FIG. 22

| Index | Info | Record |
|-------|------|--------|
| 1 | Timestamp | Timestamp Field |
| ... | ... | ... |
| x | Multi-AP Transmission Capability Info | |

| Element ID | Length | Multi-AP Transmission Capability Field |
|------------|--------|-----------------------------------------|

Multi-AP Transmission Capability Element

| C-OFDMA | C-SR | C-BF | J-TX | UL-MU MIMO | Reserved |
|---------|------|------|------|------------|----------|

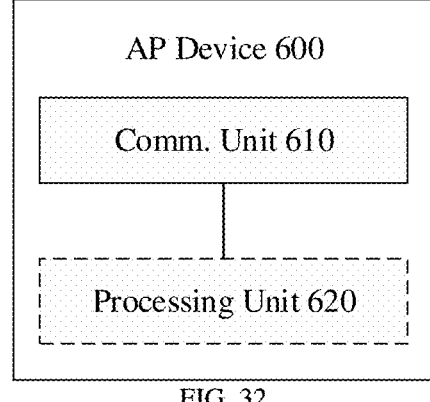
FIG. 32
STA Device 700
Comm. Unit 710
FIG. 33
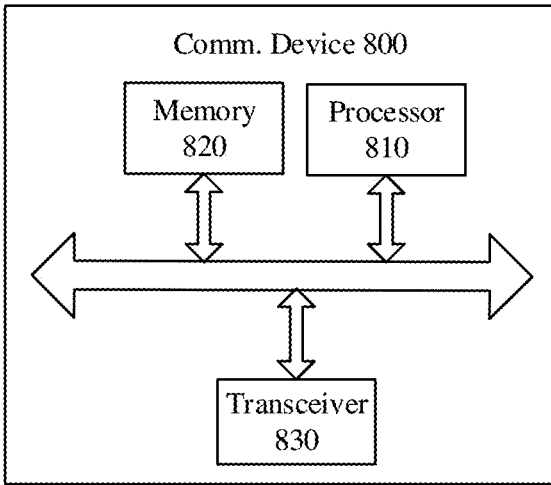
FIG. 34

WIRELESS COMMUNICATION METHOD, STATION DEVICE AND ACCESS POINT DEVICE

CROSS-REFERENCE TO RELATED APPLICATIONS

This application is a continuation of International Application No. PCT/CN2021/085416 filed on Apr. 2, 2021, the entire contents of which are incorporated herein by reference.

TECHNICAL FIELD

The embodiments of the present disclosure relate to communication technology, and more particularly, to a wireless communication method, a station device, and an access point device.

BACKGROUND

Multi-AP operation is a new feature introduced in the 802.11be standard. It provides services for one or more Stations (STAs) by coordination of multiple Access Points (APs). Before coordinated multi-AP transmission, it is necessary to set up a multi-AP coordination set. It is a problem to be solved regarding how to set up a multi-AP coordination set.

SUMMARY

The embodiments of the present disclosure provide a wireless communication method, and an access point device.

In a first aspect, a wireless communication method is provided. The method includes: transmitting, by a Master Access Point (MAP) device, first information. The first information includes common Access Point (AP) group information, the common AP group information including identifiers of a plurality of AP groups, each of the plurality of AP groups including one or more APs; or the first information includes identifiers of APs or an identifier of an AP group for multi-AP coordinated transmission with a Station (STA) device.

In a second aspect, an access point device is provided. The access point device includes a processor and a memory. The memory is configured to store a computer program, and the processor is configured to invoke and execute the computer program stored in the memory to perform the method according to any of the above first aspect.

BRIEF DESCRIPTION OF DRAWINGS

FIG. 1 is a schematic diagram showing an architecture of a communication system in which an embodiment of the present disclosure can be applied.

FIG. 2 and FIG. 3 are schematic diagrams showing MAP coverage scenarios according to embodiments of the present disclosure, respectively.

FIG. 4 is a schematic diagram showing a multi-AP set according to the present disclosure.

FIG. 5 is a schematic diagram showing discovery of surrounding APs based on a beacon frame according to the present disclosure.

FIG. 6 is a schematic diagram showing setup of a multi-AP coordination set according to the present disclosure.

FIG. 7 is a schematic diagram showing setup of a multi-AP coordination set and a multi-AP coordination set according to the present disclosure.

FIG. 8 is a schematic flowchart illustrating a wireless communication method according to an embodiment of the present disclosure.

FIG. 16 is a schematic diagram showing a group setup response frame according to an embodiment of the present disclosure.

FIG. 17 is a schematic diagram showing a group setup report frame according to an embodiment of the present disclosure.

FIG. 22 is a schematic diagram showing an association request frame and an association response frame according to an embodiment of the present disclosure.

FIG. 23 is a schematic diagram showing a beacon frame according to an embodiment of the present disclosure.

FIG. 32 is a schematic block diagram of another access point device according to an embodiment of the present disclosure.

FIG. 33 is a schematic block diagram of another station device according to an embodiment of the present disclosure.

FIG. 34 is a schematic block diagram of a communication device according to an embodiment of the present disclosure.

DESCRIPTION OF EMBODIMENTS

Figure 9:
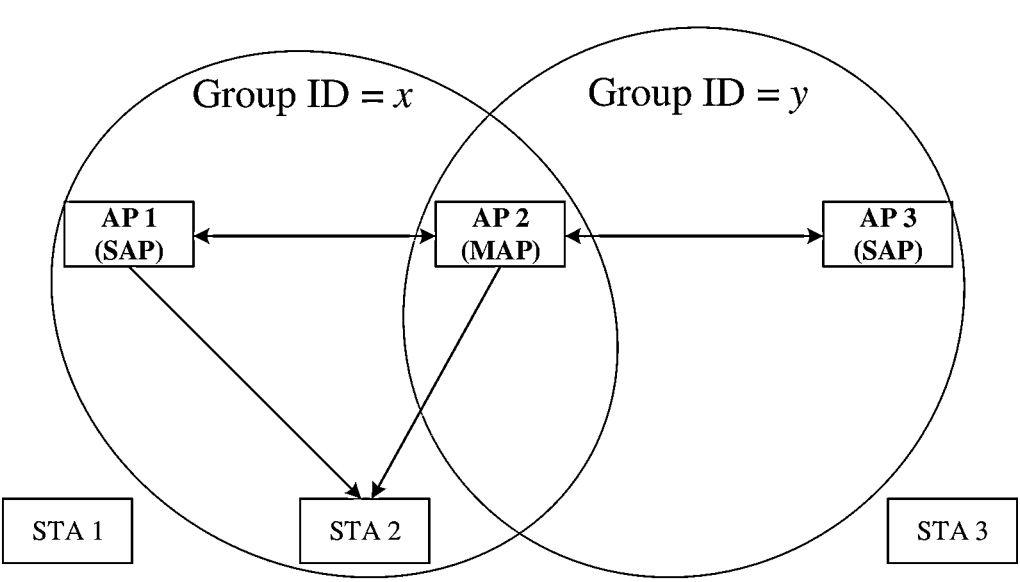
FIG. 9 is a schematic diagram showing one MAP covering all SAPs according to an embodiment of the present disclosure.

The technical solutions in the embodiments of the present disclosure will be described below with reference to the figure in the embodiments of the present disclosure. Obviously, the described embodiments are only some embodiments, rather than all embodiments, of the present disclosure. All other embodiments obtained by those skilled in the art based on the embodiments in the present disclosure without inventive efforts are to be encompassed by the scope of the present disclosure.

The solutions according to the embodiments of the present disclosure can be applied to various communication systems, including for example: Wireless Local Area Networks (WLAN), Wireless Fidelity (WiFi), or other communication systems.

Exemplarily, a communication system 100 in which an embodiment of the present disclosure is applied is shown in FIG. 1. The communication system 100 may include an Access Point (AP) device 110 and a STATION (STA) device 120 accessing a network via the AP device 110.

In the embodiments of the present disclosure, the STA device can be deployed on land, including indoor or outdoor, handheld, worn, or vehicle-mounted, deployed on water (e.g., on a ship), or deployed in the air (e.g., on an airplane, a balloon, a satellite, etc.).

In the embodiments of the present disclosure, the STA device may be a mobile phone, a tablet computer (Pad), a computer with a wireless transceiver function, a Virtual Reality (VR) device, an Augmented Reality (AR) device, a wireless device in industrial control, a wireless device in self driving, a wireless device in remote medical, a wireless device in smart grid, a wireless device in transportation safety, a wireless device in smart city, or a wireless device in smart home.

As non-limiting examples, in an embodiment of the present disclosure, the STA device may also be a wearable device. The wearable device, also known as wearable smart device, is a general term for wearable devices that are intelligently designed and developed from everyday wear, such as glasses, gloves, watches, clothes, and shoes, by applying wearable technologies. A wearable device is a portable device that can be directly worn on or integrated into a user's clothes or accessories. A wearable device is not only a kind of hardware device, but can also provide powerful functions based on software support, data interaction, and cloud interaction. In a broad sense, wearable smart devices may include full-featured, large-sized devices that can provide full or partial functions without relying on smart phones, such as smart watches or smart glasses, and devices that only focus on a certain type of application function and need to cooperate with other devices such as smart phones for use, such as various smart bracelets and smart jewelries for physical sign monitoring.

FIG. 1 exemplarily shows one AP and two STAs. Optionally, the communication system 100 may include multiple APs and other numbers of STAs. The embodiment of the present disclosure is not limited to this.

It can be appreciated that, in the embodiments of the present disclosure, a device having a communication function in a network/system may be referred to as a communication device. Taking the communication system 100 shown in FIG. 1 as an example, the communication devices may include the AP 110 and the STA 120 with communication functions. The AP 110 and the STA 120 may be the specific devices described above, and details thereof will be omitted here. The communication devices may also include other devices in the communication system 100, e.g., other network entities such as a network controller, a gateway, etc., and the embodiment of the present disclosure is not limited to any of these examples.

Exemplarily, MAP coverage scenarios in which the embodiments of the present disclosure can be applied may be as shown in FIG. 2 and FIG. 3.

As shown in FIG. 2, a MAP can cover all SAPs. If a wireless backhaul is used between the MAP and the SAPs, it means that the wireless signal of the MAP can cover all the surrounding SAPs. This is suitable for small-scale network scenarios, such as family, office etc. If a wired backhaul is used between the MAP and the SAPs, the MAP is connected to each SAP via a wired connection, and this is not limited to any specific network scale. In this scenario, only one MAP is required. Specifically, as shown in FIG. 2, the MAP covers SAP1 to SAP4.

As shown in FIG. 3, a wireless backhaul is used between a MAP and SAPs. There are many APs deployed in the network, and one MAP cannot cover all SAPs. Therefore, multiple APs with similar locations can form a group. Each group has 1 MAP, and then a controller is needed to manage these MAPs in a centralized manner. In this scenario, multiple MAPs and one controller are required. Specifically, as shown in FIG. 3, MAP1 covers SAP1 and SAP2, MAP2 covers SAPS and SAP4, and the controller manages MAP1 and MAP2 in a centralized manner.

In addition, the terms "system" and "network" may often be used interchangeably herein. The term "and/or" as used herein only represents a relationship between correlated objects, including three relationships. For example, "A and/or B" may mean A only, B only, or both A and B. In addition, the symbol "/" as used herein represents an "or" relationship between the correlated objects preceding and succeeding the symbol.

It can be appreciated that the term "indication" as used in the embodiments of the present disclosure may be a direct indication, an indirect indication, or an association. For example, if A indicates B, it may mean that A directly indicates B, e.g., B can be obtained from A. Alternatively, it may mean that A indicates B indirectly, e.g., A indicates C and B can be obtained from C. Alternatively, it may mean that there is an association between A and B.

The terms used in the embodiments of the present disclosure are provided only for explaining the specific embodiments of the present disclosure, rather than limiting the present disclosure. The terms such as "first", "second", "third", "fourth", etc., as used in the description, claims and figures of the present disclosure are used for distinguishing different objects from each other, rather than defining a specific order. In addition, the terms such as "include" and "have" and any variants thereof are intended to cover non-exclusive inclusion.

In the description of the embodiments of the present disclosure, the term "corresponding" may mean that there is a direct or indirect correspondence between the two, or may mean that there is an association between the two, or that they are in a relation of indicating and indicated, configuring or configured, or the like.

In the embodiments of the present disclosure, "predefined" may implemented as pre-stored in one or more devices (for example, including an AP and an STA) corresponding codes, tables or other means that can be used to indicate related information, and the present disclosure is not limited to its specific implementation. For example, "predefined" may refer to defined in protocols.

In the embodiments of the present disclosure, "protocols" may refer to standard protocols in the communication field, including e.g., the LTE protocol, the NR protocol, and related protocols applied in future communication systems. The present disclosure is not limited to any of these examples.

In order to facilitate understanding of the technical solutions of the embodiments of the present disclosure, the technical solutions related to the present disclosure will be described below. The following related technologies as optional solutions may be arbitrarily combined with the technical solutions of the embodiments of the present disclosure, and all these combinations are to be encompassed by the protection scope of the embodiments of the present disclosure. The embodiments of the present disclosure include at least part of the following content.

Multi-AP operation is a new feature introduced in the 802.11be standard. It provides services for one or more STAs by coordination of multiple APs. It mainly includes the following three steps:

1) Setup of multi-AP set (Setup);
2) Multi-AP channel sounding (Channel sounding);
3) Multi-AP coordinated transmission (Coordinated transmission).

The present disclosure focuses on Step 1), that is, to design the setup of the multi-AP set. The object of setup of the multi-AP coordination set is that before using multi-AP coordinated transmission, an AP should obtain information about surrounding APs and associated STAs. As shown in FIG. 4, the role of a Master AP (MAP or M-AP) is a coordinator of the multi-AP network, and the role of a Slave AP (SAP or S-AP) is to participate in the multi-AP coordinated transmission coordinated by the MAP.

In order to facilitate better understanding of the embodiments of the present disclosure, the scheme for setup of a multi-AP set initiated by an MAP related to the present disclosure will be described.

The setup of a multi-AP set can be divided into the following two stages:

Stage 1: Discovery of surrounding APs. As shown in FIG. 5, APs discover each other by receiving beacon frames or related management frames transmitted by surrounding APs (such as SAPs). The beacon frames or management frames carry information on capability of participating in multi-AP coordinated transmission.

Stage 2: Setup of multi-AP set. As shown in FIG. 6, an MAP transmits request frames to the surrounding APs (such as SAPs), and assigns an identifier (ID) for multi-AP coordinated transmission to each SAP and assigns an ID for a multi-AP coordination set (Multi-AP Group ID). Then, each SAP returns a response frame to the MAP, and the response frame carries IDs of STAs associated with the SAP and capability information of these STAs to participate in multi-AP coordinated transmission. In addition, the response frame may further carry priority information for the STA to participate in multi-AP transmission.

In order to facilitate better understanding of the embodiments of the present disclosure, a scheme for establishing a multi-AP set recommended by an STA related to the present disclosure will be described.

The setup of a multi-AP set is divided into two stages:

Stage 1: Association Stage. As shown in FIG. 7, STA 1 exchanges multi-AP coordination capability information with AP 2, to learn whether AP 2 supports multi-AP transmission capability, which multi-AP network AP 2 belongs to, and member information of the multi-AP network.

Stage 2: Preparation Stage. As shown in FIG. 7, AP 2 or STA 1 can initiate a process of setting up a multi-AP coordination set, and decide which APs can participate in the next multi-AP coordinated transmission. It is to be noted that STA 1 can recommend APs (such as AP 3 and AP 4) to AP 2 for multi-AP coordinated transmission, and then AP 2 confirms the recommended APs (such as AP 2+AP 3) and initiates the subsequent multi-AP coordinated transmission process.

In the above scheme for setting up the multi-AP set initiated by the MAP, the MAP selects the SAPs to perform multi-AP transmission for STAs. Considering the dynamically varying wireless communication environment, information on APs surrounding an STA can be updated in real time by the STA by receiving beacon frames or other management frames of the surrounding APs, but the MAP cannot obtain the information in real time. Thus, it is not suitable for the MAP to directly recommend SAPs for multi-AP transmission with the STA. In addition, this scheme only points out the basic functions of the request frame and the response frame, but does not design detailed frame structures, and thus it needs to be further improved and refined.

For the scheme of setup of the multi-AP set recommended by the above STA, the STA recommends suitable APs around it to its associated APs for multi-AP coordinated transmission. The overhead and delay are relatively high since each time the STA moves, it needs to recommend surrounding APs to set up a multi-AP coordinated transmission set. In addition, this solution only points out the basic flow, and does not design the detailed signaling flow and frame structure, and thus this scheme needs to be further improved and refined.

Based on the above technical problems, the present disclosure provides a solution for establishing a multi-AP group, which can overcome the above technical problems.

The technical solutions of the present disclosure will be described in detail below with reference to specific examples.

FIG. 8 is a schematic interaction diagram illustrating a wireless communication method 200 according to an embodiment of the present disclosure. As shown in FIG. 8, the wireless communication method 200 may include at least part of the following content.

At S210, an MAP device transmits first information. The first information includes common AP group information, the common AP group information including identifiers of a plurality of AP groups, each of the plurality of AP groups including one or more APs; or the first information includes identifiers of APs or an identifier of an AP group for multi-AP coordinated transmission with an STA device.

For example, the MAP device may transmit the first information in a multicast or broadcast manner.

At S220, the STA device and/or an SAP device receives the first information.

In an embodiment of the present disclosure, if the first information includes the common AP group information, the MAP device can transmit the common AP group information to an STA device associated with an SAP via the SAP, such that the STA device can request the AP group to provide a multi-AP transmission service for it.

It should be noted that the "group" in the embodiment of the present disclosure may also be referred to as a "set", and the present disclosure is not limited to this.

In some embodiments, a MAP device may cover all SAPs, e.g., as shown in FIG. 9. In this case, the MAP device may initiate a group setup process to determine the common AP group information, and the common AP group information is common for all STAs within the coverage.

Figure 10:
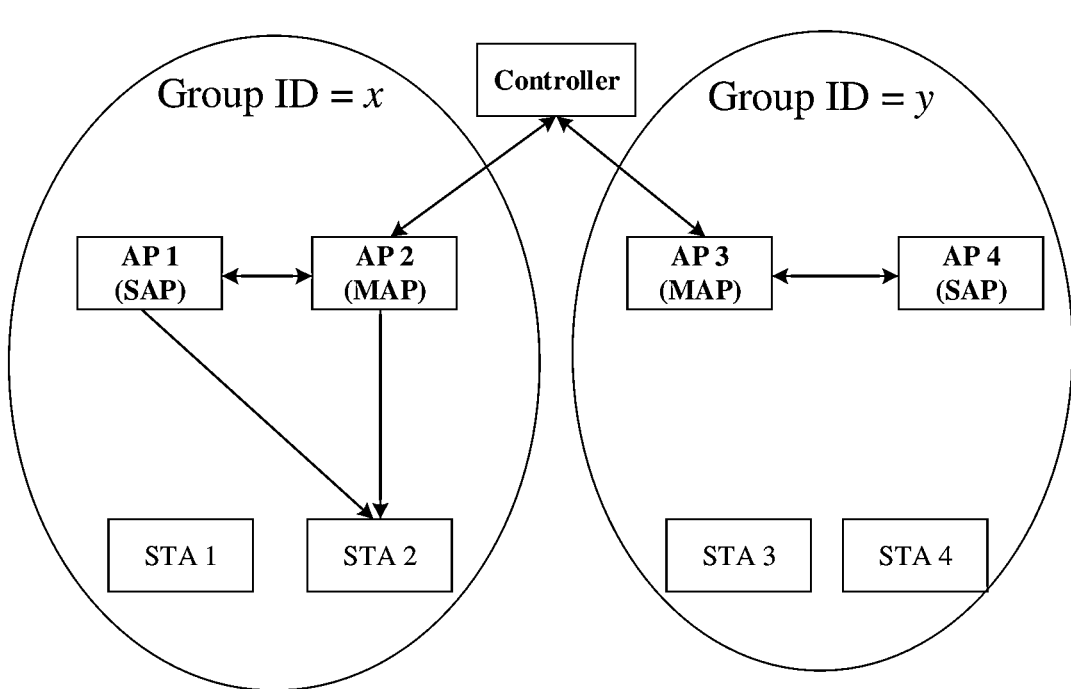
FIG. 10 is a schematic diagram showing one MAP not covering all SAPs according to an embodiment of the present disclosure.

In some embodiments, a MAP device cannot cover all SAPs, e.g., as shown in FIG. 10 above. In this case, each of a plurality of MAP devices initiates a group setup process, and reports its configured group information to a controller, and the controller determines the common AP group information and indicates it to each MAP device. The common AP group information is common for all STAs within the coverage.

Example 1: The first information includes the common AP group information.

In some implementations of Example 1, the MAP device transmits the first information to at least one SAP device within the coverage of the MAP device.

Specifically, the at least one SAP device may be an SAP that accepts a group setup request. In addition, after the at least one SAP device obtains the common AP group information, it may transmit the common AP group information to some or all of its associated STAs, such that the STA devices can request the AP group to provide a multi-AP transmission service for it according to the common AP group information.

In some implementations, the first information may be transmitted via a Group Setup Confirm frame.

Here, the group setup confirm frame may include at least a group setup confirm field, and the group setup confirm field may include a plurality of group information fields and a field indicating a number of AP groups in the plurality of AP groups. The plurality of group information fields may correspond to the plurality of AP groups, respectively. Each of the plurality of group information fields may include an identification field indicating the corresponding AP group, a field indicating a supported type of multi-AP coordinated transmission, a field indicating a number of APs in the group, and a field indicating a BSSID of each AP.

Figure 11:
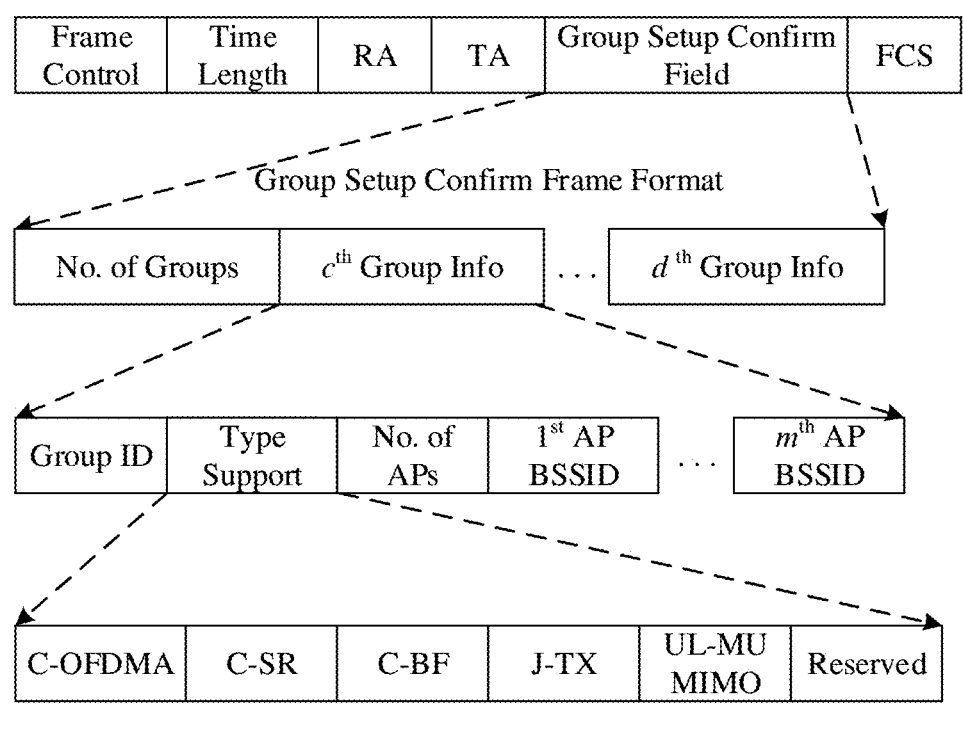
FIG. 11 is a schematic diagram showing a group setup confirm frame according to an embodiment of the present disclosure.

Specifically, as shown in FIG. 11, the group setup confirm frame includes Frame Control (2 octets), Time Length (2 octets), Receiving Address (RA) (6 octets), Transmission Address (TA) (6 octets), Group Setup Confirmation field (the number of octets depends on requirements (variable)), and Frame Check Sequence (FCS) (4 octets). Here, the Group Setup Confirmation field includes a plurality of Group Information fields and a field (Number of Groups, 1 octet) indicating a number of AP groups in the plurality of AP groups. The plurality of Group Information fields correspond to the plurality of APs group, respectively. Each of the plurality of Group Information fields (the number of octets depends on requirements (variable)) includes an ID field (1 octet) indicating the corresponding AP group, and a field (Type Support, 1 octet) indicating a supported type of multi-AP coordinated transmission, a field (1 octet) indicating a number of APs in the group, and a field (6 octets) indicating a BSSID of each AP.

As shown in FIG. 11, the supported type of multi-AP coordinated transmission (type Support) includes Coordinated Orthogonal Frequency Division Multiple Access (C-OFDMA) (1 bit), Coordinated Spatial Reuse (C-SR) (1 bit), Coordinated Beamforming (C-BF) (1 bit), Joint Transmission (J-TX) (1 bit), Uplink Multi User Multiple Input Multiple Output (UL-MU MIMO) (1 bit), and reserved (3 bits).

It should be noted that, in the following related frames, for the field indicating a supported type of multi-AP coordinated transmission, reference can be made to the description in FIG. 11 above, and details thereof will be omitted.

In some implementations of Example 1, after obtaining the common AP group information, and when multi-AP coordinated transmission is required, the STA device may transmit second information to the MAP device. The second information includes an identifier of at least one AP group recommended by the STA device for multi-AP coordinated transmission from the plurality of AP groups.

In some implementations, the second information may be transmitted via a first Group Recommend frame.

Here, the first Group Recommend frame includes at least a Group Recommend field. The Group Recommend field includes at least one group information field and a field indicating a number of AP groups in the at least one AP group. The at least one group information field corresponds to the at least one AP group, respectively. Each of the at least one group information field includes an identification field indicating the corresponding AP group and a field indicating a supported type of multi-AP coordinated transmission.

Figure 12:
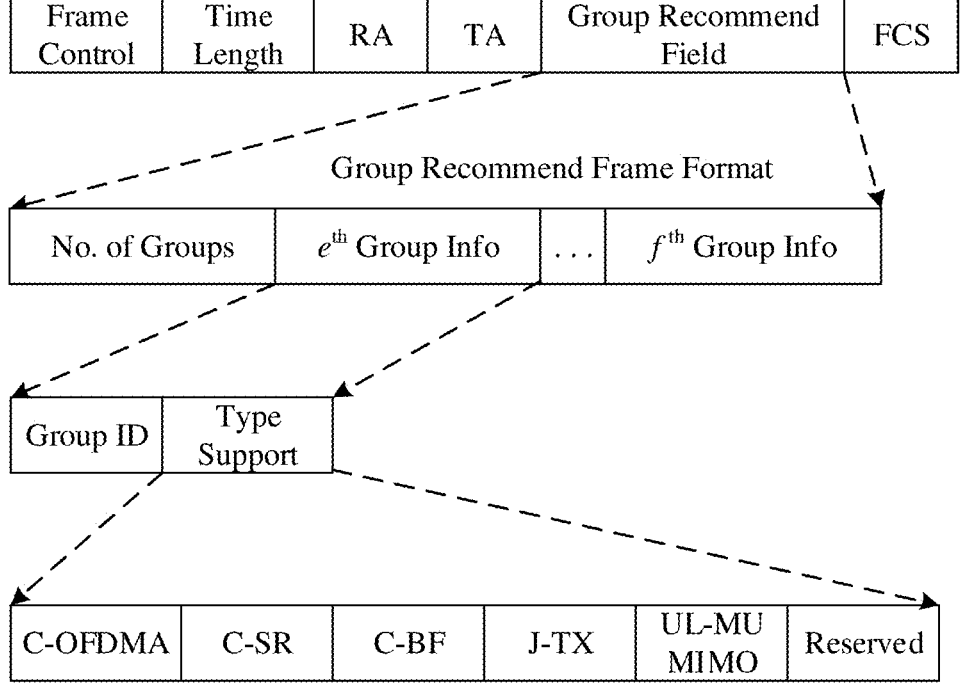
FIG. 12 is a schematic diagram showing a group recommend frame according to an embodiment of the present disclosure.

Specifically, as shown in FIG. 12, the first Group Recommend frame includes Frame Control (2 octets), Time Length (2 octets), RA (6 octets), TA (6 octets), Group Recommend field (the number of octets depends on requirements (variable)), and FCS (4 octets). The Group Recommend field includes at least one Group Information field and a field (1 octet) indicating a number of AP groups in the at least one AP group. The at least one group information field corresponds to the at least one AP group, and each of the at least one group information field (2 octets) includes an ID field (1 octet) indicating the corresponding AP group and a field (1 octet) indicating a supported type of multi-AP coordinated transmission.

In some implementations of Example 1, after the MAP receives the second information, the MAP device may transmit third information to the STA device and/or APs in the at least one AP group. The third information includes an identifier of the at least one AP group.

In some implementations, the third information may instruct APs in the at least one AP group to enter a sounding and transmission stage.

In some implementations, the third information may be transmitted via a Group Confirm frame. The Group Confirm frame includes at least a Group Confirm field, and the Group Confirm field includes a group identification field, a field indicating a supported type of multi-AP coordinated transmission, a field indicating a number of APs in the group, and a field indicating a BSSID of each AP.

Figures 13, 14, 15:
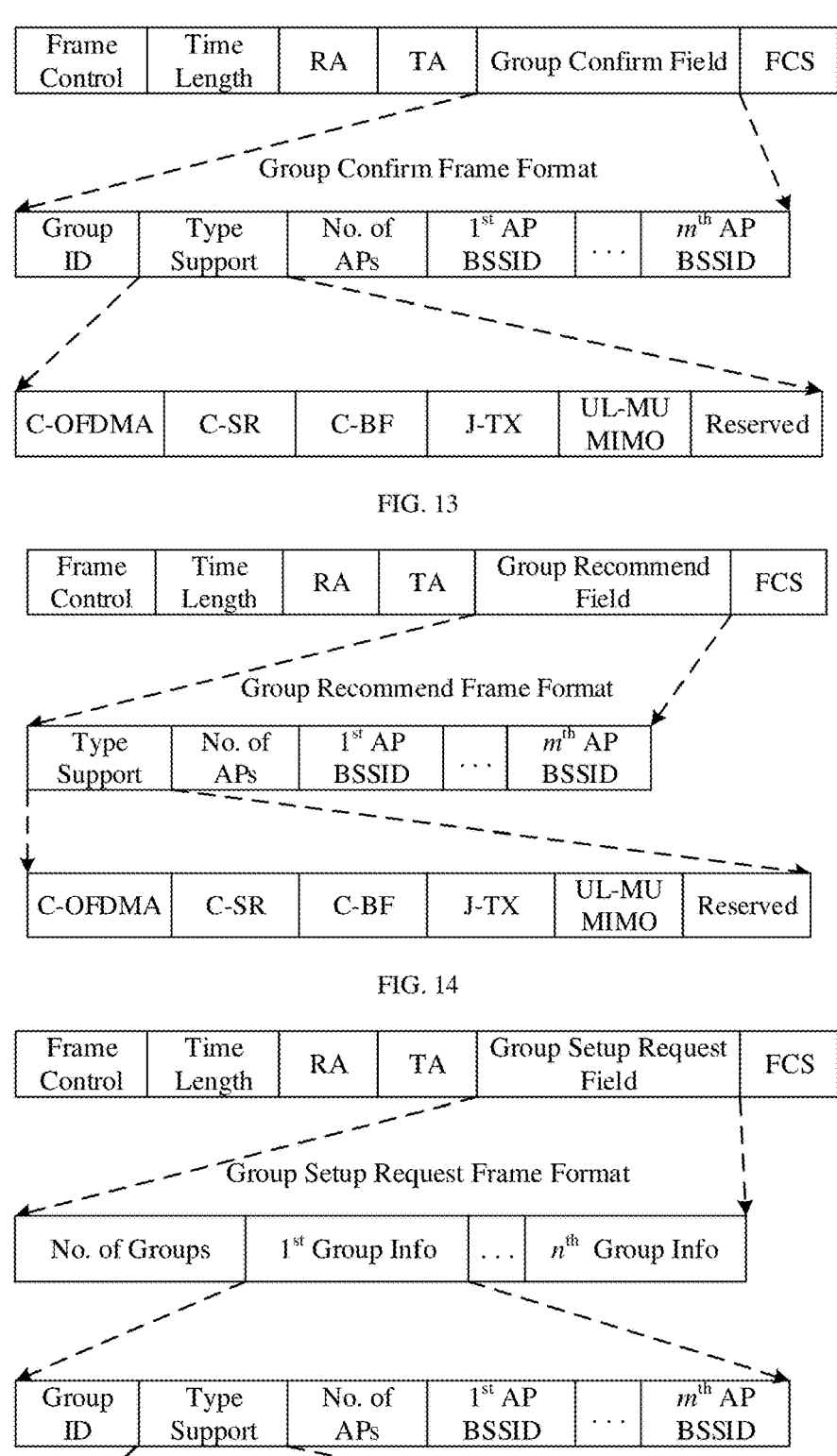
FIG. 13 is a schematic diagram showing a group confirm frame according to an embodiment of the present disclosure.
FIG. 14 is a schematic diagram showing another group recommend frame according to an embodiment of the present disclosure.
FIG. 15 is a schematic diagram showing a group setup request frame according to an embodiment of the present disclosure.

Specifically, as shown in FIG. 13, the Group Confirm frame includes Frame Control (2 octets), Time Length (2 octets), RA (6 octets), TA (6 octets), Group Confirm field (the number of octets depends on requirements (variable)), and FCS (4 octets). The Group Confirm field includes a Group ID field (1 octet), a field (1 octet) indicating a supported type of multi-AP coordinated transmission, a field (1 octet) indicating a number of APs in the group, and a field (6 octets) indicating a BSSID of each AP.

In some implementations of Example 1, after obtaining the common AP group information, and when multi-AP coordinated transmission is required, the STA device may determine that the plurality of AP groups in the common AP group information are not suitable for multi-AP coordinated transmission, and the STA device may transmit fourth information to the MAP device. The fourth information includes identifiers of a plurality of APs recommended by the STA device for multi-AP coordinated transmission. Correspondingly, the MAP device may initiate a group setup request according to the fourth information, to obtain target AP group information including identifiers of a part or all of the plurality of APs.

That is, the target AP group is an AP group determined by the MAP device for multi-AP coordinated transmission.

It should be noted that when the target AP group information includes identifiers of a part of the plurality of APs, it means that some of the plurality of APs have rejected the group setup request initiated by the MAP device.

In some implementations, the fourth information may be transmitted via a second Group Recommend frame.

Here, the second Group Recommend frame includes at least a Group Recommend field, and the Group Recommend field includes a field indicating a supported type of multi-AP coordinated transmission, a field indicating a number of APs in the plurality of APs, and a field indicating a BSSID of each AP.

Specifically, as shown in FIG. 14, the second Group Recommend frame includes Frame Control (2 octets), Time Length (2 octets), RA (6 octets), TA (6 octets), Group Recommend field (the number of octets depends on requirements (variable)), and FCS (4 octets). Here, the Group Recommend field includes a field (1 octet) indicating a supported type of multi-AP coordinated transmission, a field (1 octet) indicating a number of APs in the plurality of APs, and a field (6 octets) indicating a BSSID of each AP.

In some implementations, the MAP device may transmit fifth information to the STA device and/or the APs included in the target AP group information. The fifth information includes an identifier of each AP included in the target AP group information.

In some implementations, the fifth information may instruct each AP included in the target AP group information to enter a sounding and transmission stage.

In some implementations, the fifth information may be transmitted via a Group Confirm frame. Here, the Group Confirm frame includes at least a Group Confirm field, and the Group Confirm field includes a Group Identification field of the target AP group, a field indicating a supported type of multi-AP coordinated transmission, a field indicating a number of APs in the target AP group, and a field indicating a BSSID of each AP.

It should be noted that, for the specific description of the Group Confirm frame carrying the fifth information, reference may be made to the description in FIG. 13 above, and details thereof will be omitted here.

In some implementations of Example 1, the MAP device may transmit sixth information to a part or all SAP devices within the coverage of the MAP device. The sixth information requests setup of a common multi-AP group, and the sixth information includes AP groups pre-configured by the MAP device and their respective group identifiers. That is, the MAP device initiates a group setup process.

In some implementations, the sixth information may be transmitted via a Group Setup Request frame.

Here, the Group Setup Request frame includes at least a Group Setup Request field, and the Group Setup Request field includes a plurality of Group Information fields and a field indicating a number of AP groups in the pre-configured AP groups. The plurality of group information fields correspond to the pre-configured AP groups, respectively. Each of the plurality of group information fields includes an ID field indicating the corresponding AP group, a field indicating a supported type of multi-AP coordinated transmission, a field indicating a number of APs in the group, and a field indicating a BSSID of each AP.

Specifically, as shown in FIG. 15, the Group Setup Request frames includes Frame Control (2 octets), Time Length (2 octets), RA (6 octets), TA (6 octets), Group Setup Request field (the number of octets depends on requirements), and FCS (4 octets). Here, the Group Setup Request field includes a plurality of Group Information fields and a field (1 octet) indicating a number of AP groups in the pre-configured AP groups. The plurality of Group Information fields correspond to the pre-configured AP groups, respectively. Each of the plurality of Group Information fields (the number of octets depends on requirements) includes an ID field (1 octet) indicating the corresponding AP group, and a field (1 octet) indicating a supported type of multi-AP coordinated transmission, a field (1 octet) indicating a number of APs in the group, and a field (6 octets) indicating a BSSID of each AP.

In some implementations, the MAP device receive seventh information transmitted by at least one SAP device within the coverage of the MAP device. The seventh information includes confirmation feedback information for the sixth information.

In some implementations, the seventh information may include STA device capability information and/or service priority information associated with each of the at least one SAP device.

In some implementations, the seventh information may be transmitted via a Group Setup Response frame.

Here, the Group Setup Response frame includes at least a Group Setup Response field. The Group Setup Response field includes an acceptance field, a field indicating a number of STAs, a field indicating a physical address of each STA, a field indicating priority information of each STA, and a field indicating capability information of each STA.

For example, the physical address of an STA may be a Media Access Control (MAC) address.

Specifically, as shown in FIG. 16, the Group Setup Response frame includes Frame Control (2 octets), Time Length (2 octets), RA (6 octets), TA (6 octets), Group Setup Response field (the number of octets depends on requirements), and FCS (4 octets). Here, the Group Setup Response field includes an acceptance field (1 octet), a field (1 octet) indicating a number of STAs, a field (6 octets) indicating a physical address of each STA, a field (the number of octets depends on requirements) indicating priority information of each STA, and a field (1 octet) indicating capability information of each STA.

Specifically, the field indicating capability information of each STA includes C-OFDMA (1 bit), C-SR (bit), C-BF (1 bit), J-TX (1 bit), UL-MU MIMO (1 bit), and reserved (3 bits).

In some implementations of Example 1, the MAP device may determine the common AP group information according to the seventh information. Specifically, for example, in the scenario where the MAP device can cover all SAPs, that is, one as shown in FIG. 9, the MAP device may determine the common AP group information according to the seventh information.

In some implementations of Example 1, the MAP device may transmit eighth information to a controller according to the seventh information. The eighth information includes AP groups pre-configured by the MAP device and their respective group identifiers. Specifically, for example, in the scenario where the MAP device cannot cover all SAPs, that is, one as shown in FIG. 10, the MAP device may transmit eighth information to the controller according to the seventh information, such that the controller can determine the common AP group information.

In some implementations, the eighth information is transmitted via a group setup report frame.

The group setup report frame at least includes a group setup report field, and the group setup report field includes a plurality of group information fields and a field indicating the number of pre-configured AP groups. The plurality of group information fields correspond to the pre-configured AP groups, respectively. Each of the plurality of group information fields includes an ID field indicating the corresponding AP group, a field supporting a type of multi-AP coordinated transmission, a field indicating the number of APs in the group, and a BSSID field of each AP.

Specifically, as shown in FIG. 17, the Group Setup Report frame includes Frame Control (2 octets), Time Length (2 octets), RA (6 octets), TA (6 octets), Group Setup Report field (the number of octets depends on requirements), and FCS (4 octets). Here, the Group Setup Report field includes a plurality of Group Information fields and a field (1 octet) indicating a number of AP groups in the pre-configured AP groups. The plurality of Group Information fields correspond to the pre-configured AP groups, respectively. Each of the plurality of Group Information fields (the number of octets depends on requirements) includes an ID field (1 octet) indicating the corresponding AP group, and a field (1 octet) indicating a supported type of multi-AP coordinated transmission, a field (1 octet) indicating a number of APs in the group, and a field (6 octets) indicating a BSSID of each AP.

In some implementations, the MAP device may receive ninth information transmitted by the controller, the ninth information including the common AP group information. Specifically, the controller may determine the common AP group information based on the pre-configured AP groups reported by respective MAPs.

In some implementations of Example 1, the MAP device may initiate setup of a multi-AP coordination set, divide APs in the network into a number of common AP groups in advance, and assign Group IDs. Generally speaking, one Group ID corresponds to a plurality of APs. Of course, it may be possible that each AP forms a group and uses the BSSID of the AP as the Group ID, that is, one Group ID corresponds to one AP. Then, the STA recommends the Group ID to the MAP for multi-AP coordinated transmission, but recommending the Group ID here is equivalent to recommending a specific AP to set up a group. It is also equivalent to configuring a common AP group in advance and assigning a Group ID, and then the STA recommending the Group ID for multi-AP coordinated transmission.

In the solution of Example 1, the MAP device initiates setup of a multi-AP coordination set, divide APs in the network into a number of common AP groups in advance, and assign Group IDs. These Group IDs are consistent for all STAs in the network. Therefore, when the STA requests multi-AP coordinated transmission, it only needs to recommend one or more suitable Group IDs to the MAP device according to its own environment information (such as received signal strength from surrounding APs, etc.), and then the MAP device confirms the best AP group for providing a multi-AP coordinated transmission service for the STA. Considering the mobile environment, when the STA moves, the STA only needs to recommend a new Group ID to the MAP, since the multi-AP coordination set has been configured in advance, which avoids the overhead for resetting up the multi-AP coordination set every time it moves.

It should be noted that the BSSID of the AP in the embodiment of the present disclosure may be replaced by a short BSSID, a Basic service set (BSS) color, and the like.

Example 2: The first information includes the identifiers of the APs or the identifier of the AP group for multi-AP coordinated transmission with the STA device. In this case, the STA device may directly perform multi-AP coordinated transmission according to the APs or AP group included in the first information. That is, the multi-AP coordinated transmission can be performed directly without setting up a multi-AP coordination set.

In some implementations of Example 2, the MAP device may transmit the first information to the STA device and/or the APs or the APs in the AP group for multi-AP coordinated transmission with the STA device.

In some implementations, the first information may be transmitted via a Group Recommend frame. Here, the Group Recommend frame includes at least a Group Recommend field, and the Group Recommend field includes a field indicating a supported type of multi-AP coordinated transmission, a field indicating the identifiers of the APs or the identifier of the AP group for multi-AP coordinated transmission with the STA device, and a field indicating a BSSID of each AP.

Figure 18:
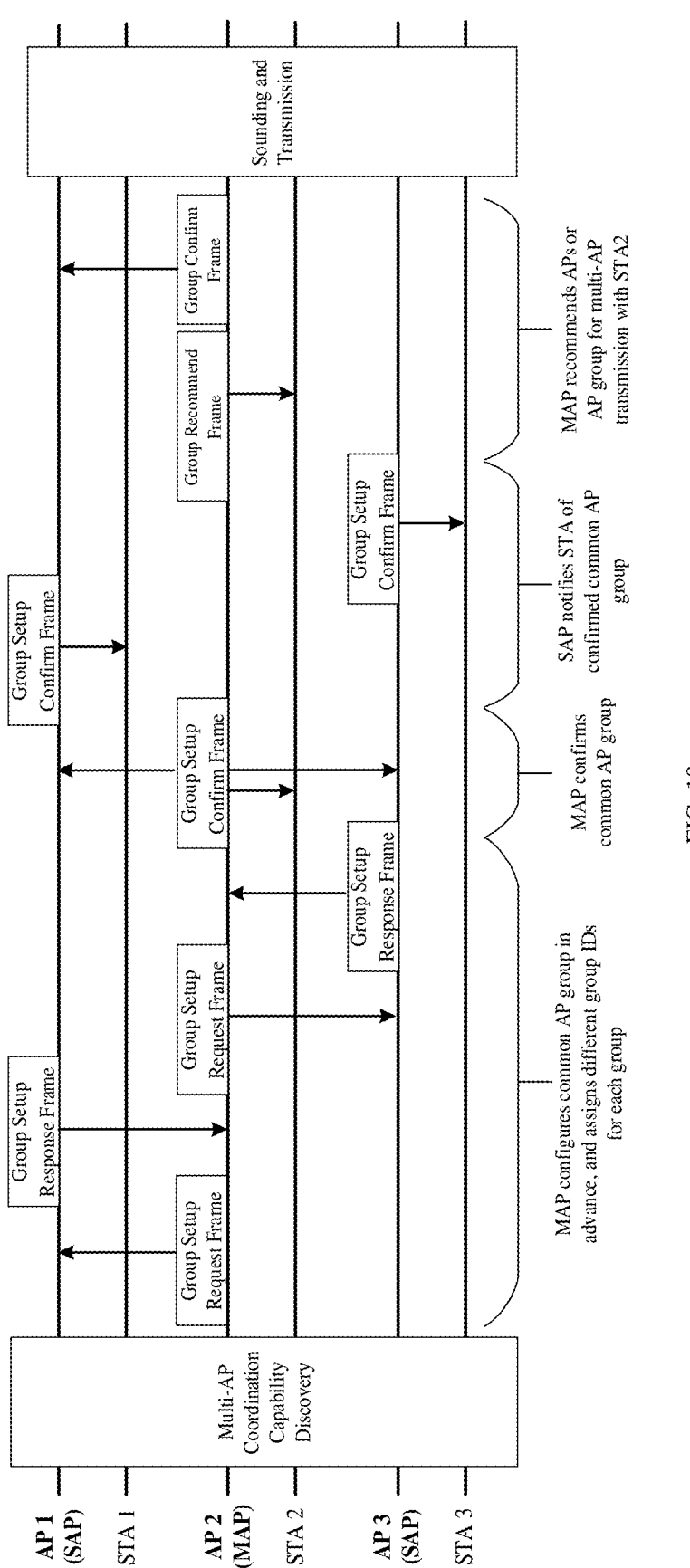
FIG. 18 to FIG. 21 are schematic diagrams showing an MAP transmitting first information directly to an STA according to embodiments of the present disclosure.

For example, as shown in FIG. 18, the MAP (that is, AP2) initiates the AP group setup process, and determines the common AP group information. After the MAP (that is, AP2) transmits the common AP group information to the STA associated with the SAPs (that is, AP1 and AP3) via the SAPs, the MAP device transmits the identifiers of the APs or the identifier of the AP group for multi-AP coordinated transmission with the STA device to the STA device (that is, STA2) via a Group Recommend frame. Then the MAP device notifies the selected coordinated AP (that is, AP1) via a Group Confirm frame.

Figure 19:
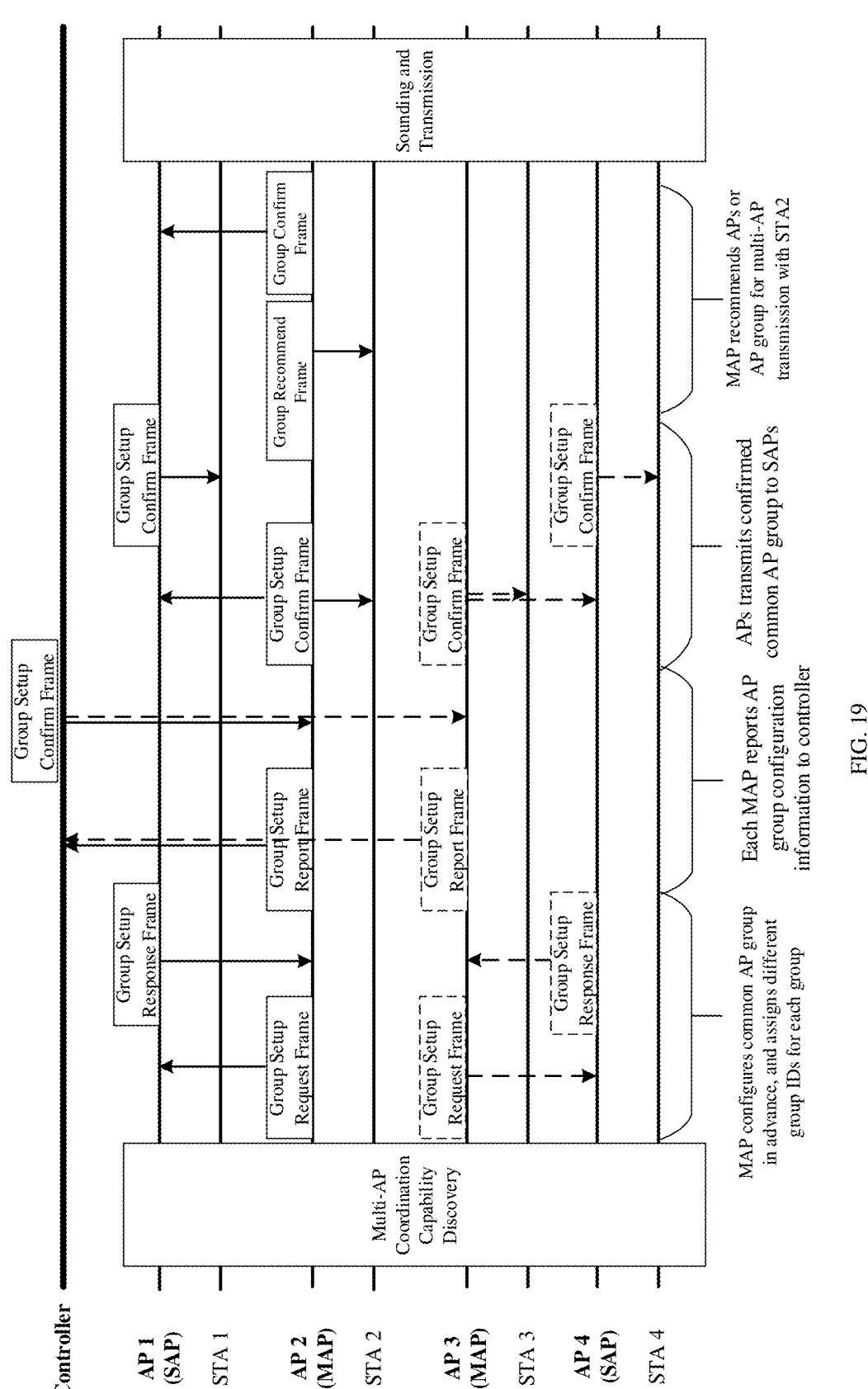

In another example, as shown in FIG. 19, the MAP (that is, AP2) initiates the AP group setup process, and reports the AP group pre-configured by the MAP (that is, AP2) and its corresponding group identifier to the controller, and receives the common AP group information from the controller. After the MAP (that is, AP2) transmits the common AP group information to the STA associated with the SAPs (that is, API and AP3) via the SAP, the MAP device transmits the identifiers of the APs or the identifier of the AP group for multi-AP coordinated transmission with the STA device to the STA device (that is, STA2) via a Group Recommend frame. Then the MAP device notifies the selected coordinated AP (that is, API) via a Group Confirm frame.

In some implementations, the first information may be transmitted via a Group Confirm frame. Here, the Group Confirm frame includes at least a Group Confirm field, and the Group Confirm field includes a field indicating a supported type of multi-AP coordinated transmission and a field indicating a BSSID of each AP for multi-AP coordinated transmission with the STA device, or the Group Confirm field includes a field indicating a supported type of multi-AP coordinated transmission, a field indicating the identifier of the AP group for multi-AP coordinated transmission with the STA device, and a field indicating a BSSID of each AP.

Figure 20:
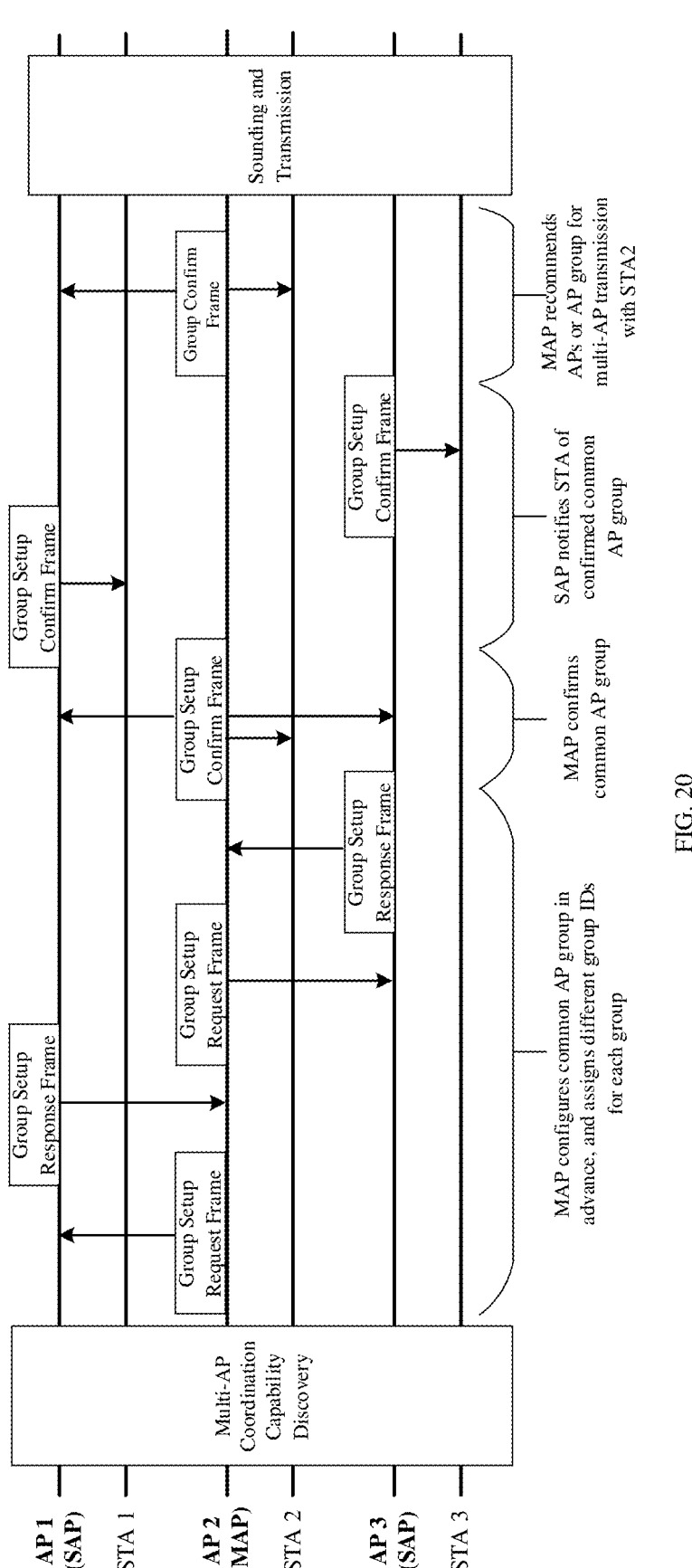

For example, as shown in FIG. 20, the MAP (that is, AP2) initiates the AP group setup process, and determines the common AP group information. After the MAP (that is, AP2) transmits the common AP group information to the STA associated with the SAPs (that is, AP1 and AP3) via the SAPs, the MAP device transmits the identifiers of the APs or the identifier of the AP group for multi-AP coordinated transmission with the STA device to the STA device (that is, STA2) and the coordinated AP (that is, AP1) via a Group Confirm frame.

Figure 21:
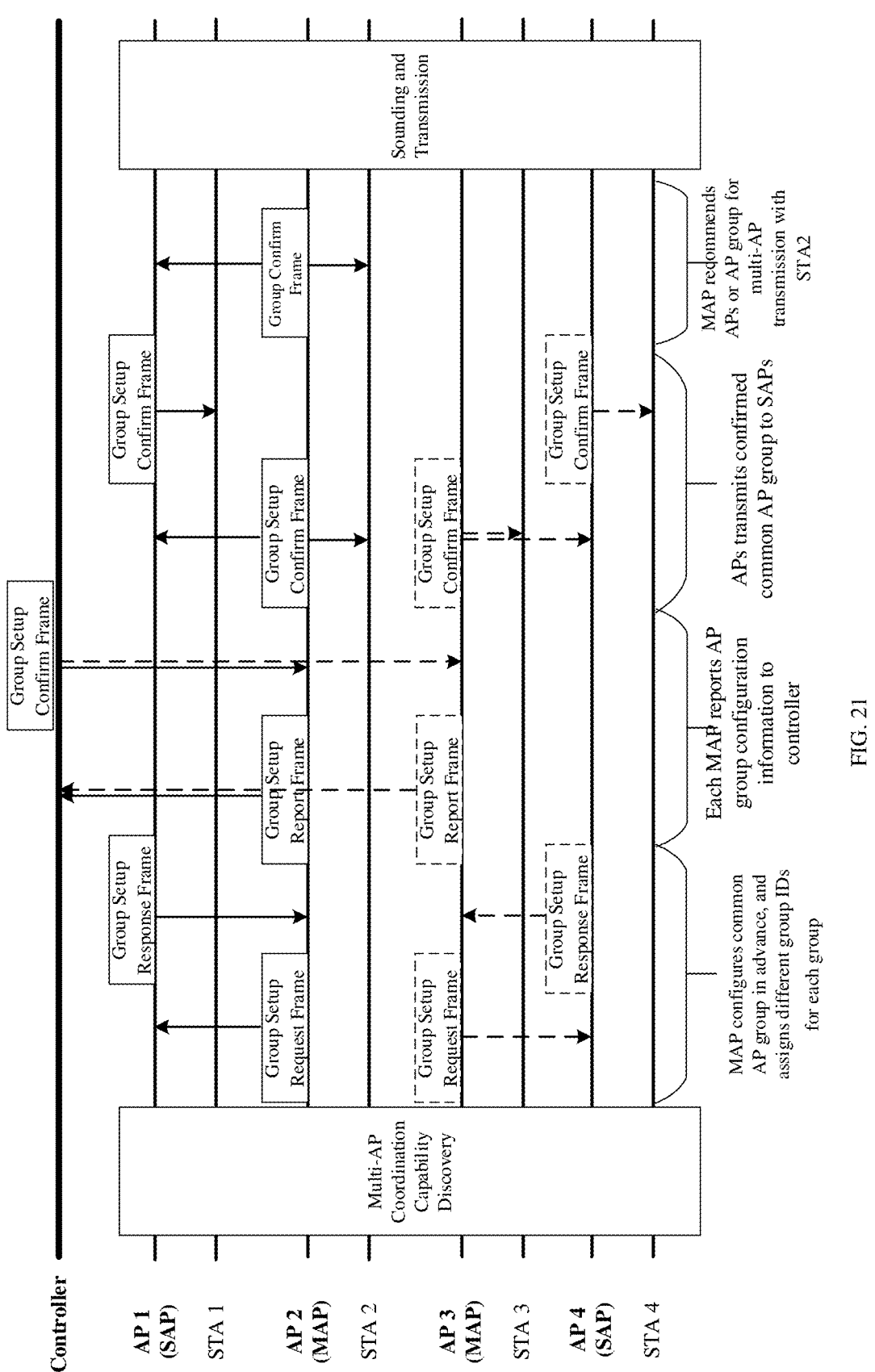

In another example, as shown in FIG. 21, the MAP (that is, AP2) initiates the AP group setup process, and reports the AP group pre-configured by the MAP (that is, AP2) and its corresponding group identifier to the controller, and receives the common AP group information from the controller. After the MAP (that is, AP2) transmits the common AP group information to the STA associated with the SAPs (that is, AP1 and AP3) via the SAP, the MAP device transmits the identifiers of the APs or the identifier of the AP group for multi-AP coordinated transmission with the STA device to the STA device (that is, STA2) and the coordinated AP (that is, AP1) via a Group Confirm frame.

In some embodiments, the MAP device may transmit tenth information to a part or all SAP devices within the coverage of the MAP device, the tenth information requesting multi-AP transmission capability information.

It should be noted that the discovery of the multi-AP coordination capability is the prerequisite for the setup of the multi-AP coordination group (i.e., the above common AP group information). In the multi-AP coordination capability discovery stage, the AP and the STA, or the APs, exchange their respective multi-AP coordination capability information. That is, the MAP device may request multi-AP transmission capability information by transmitting the tenth information to a part or all STA devices within the coverage of the MAP device.

In some embodiments, the tenth information may be transmitted via an Association Request frame. Here, the association request frame includes at least Multi-AP Transmission Capability information, and the Multi-AP Transmission Capability information includes a Multi-AP Transmission Capability field. Alternatively, the Multi-AP Transmission Capability field may be included in the reserved bits of the association request frame.

The Association Request frame may include capability information and multi-AP transmission capability information, specifically as shown in FIG. 22. Here, the multi-AP transmission capability information includes a Multi-AP Transmission Capability field (1 octet), Element ID (1 octet), and Length (1 octet). In addition, as shown in FIG. 22, the Multi-AP Transmission Capability field, Element ID and Length can correspond to a multi-AP transmission capability element, which includes C-OFDMA (1 bit), C-SR (1 bit), C-BF (1 bit), J-TX (1 bit), UL-MU MIMO (1 bit) and reserved (3 bits).

In some embodiments, the MAP device may receive eleventh information transmitted by at least one STA device within the coverage of the MAP device, the eleventh information including confirmation feedback information for the tenth information.

In some embodiments, the eleventh information may be transmitted via an Association Response frame. Here, the Association Response frame includes at least Multi-AP Transmission Capability information, and the Multi-AP Transmission Capability information includes a Multi-AP Transmission Capability field. Alternatively, the Multi-AP Transmission Capability field may be included in the reserved bits of the association response frame.

The Association Response frame may include capability information and multi-AP transmission capability information, specifically as shown in FIG. 22. Here, the multi-AP transmission capability information includes a Multi-AP Transmission Capability field (1 octet), Element ID (1 octet), and Length (1 octet). In addition, as shown in FIG. 22, the Multi-AP Transmission Capability field, Element ID and Length can correspond to a multi-AP transmission capability element, which includes C-OFDMA (1 bit), C-SR (1 bit), C-BF (1 bit), J-TX (1 bit), UL-MU MIMO (1 bit) and reserved (3 bits).

In some embodiments, the MAP device may exchange twelfth information with at least one SAP device within the coverage of the MAP device, the twelfth information including multi-AP transmission capability information.

In some embodiments, the twelfth information may be transmitted via a beacon frame. Here, the beacon frame includes at least Multi-AP Transmission Capability information, and the Multi-AP Transmission Capability information includes a Multi-AP Transmission Capability field. Alternatively, the Multi-AP Transmission Capability field is included in the reserved bits of the beacon frame.

Specifically, as shown in FIG. 23, the beacon frame may include a time stamp and multi-AP transmission capability information. Here, the multi-AP transmission capability information includes a Multi-AP Transmission Capability field (1 octet), Element ID (1 octet), and Length (1 octet). In addition, as shown in FIG. 23, the Multi-AP Transmission Capability field, Element ID and Length can correspond to a multi-AP transmission capability element, which includes C-OFDMA (1 bit), C-SR (1 bit), C-BF (1 bit), J-TX (1 bit), UL-MU MIMO (1 bit) and reserved (3 bits).

Figure 24:
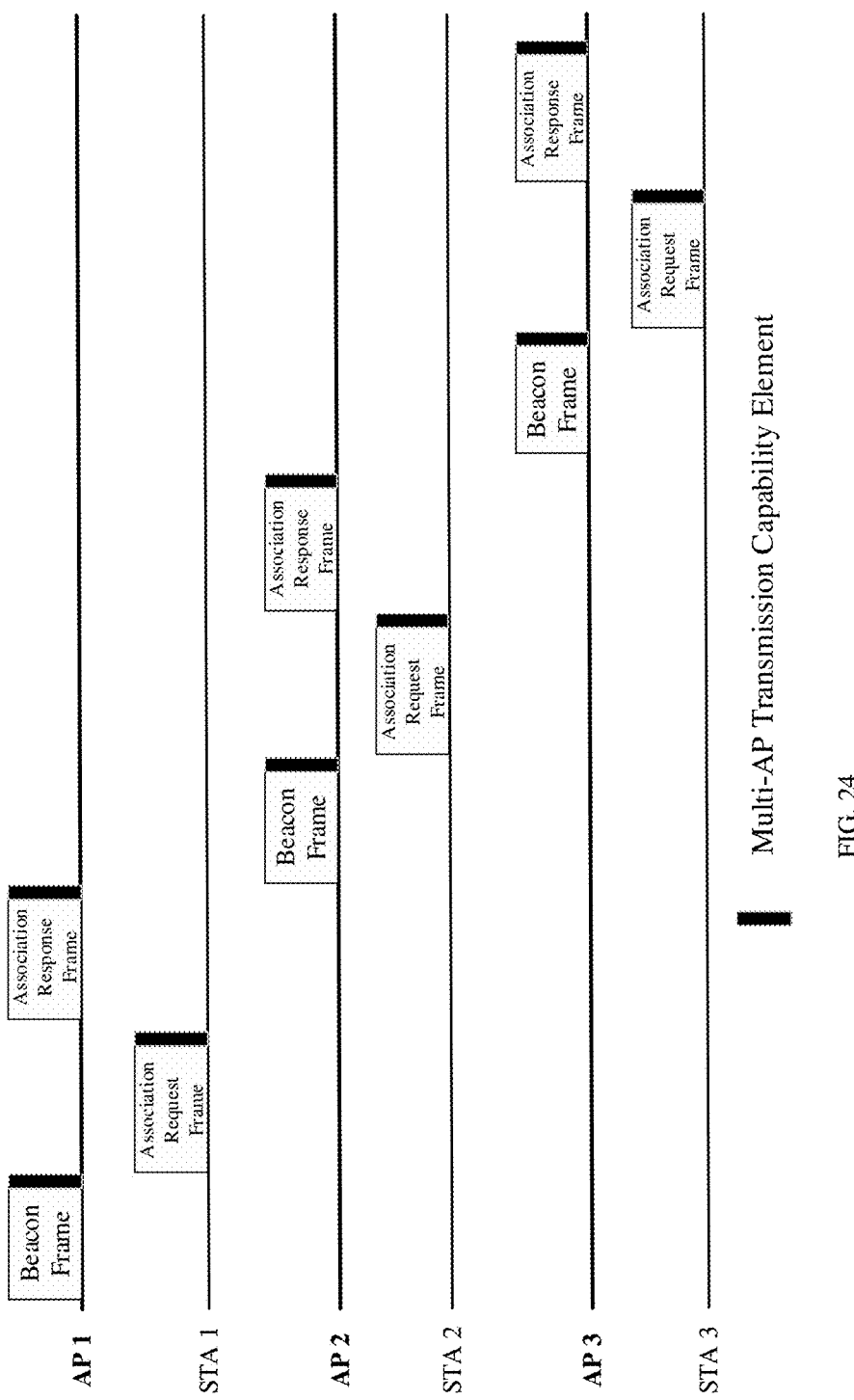
FIG. 24 is a schematic diagram showing a discovery process of a multi-AP coordination capability according to an embodiment of the present disclosure.

In some embodiments, the specific process of the multi-AP coordination capability discovery stage may be shown in FIG. 24, and the multi-AP coordination capability information may be exchanged between the AP and the STA via an Association Request frame or an Association Response frame. The APs can learn the multi-AP coordination capability information of each other by receiving beacon frames from each other. Specifically, a Multi-AP Transmission Capability element can be added in the Association Request frame, Association Response frame, and beacon frame, or a Multi-AP Transmission Capability field can be added in the reserved bits of the Association Request frame, Association Response frame, and beacon frame.

Figure 25:
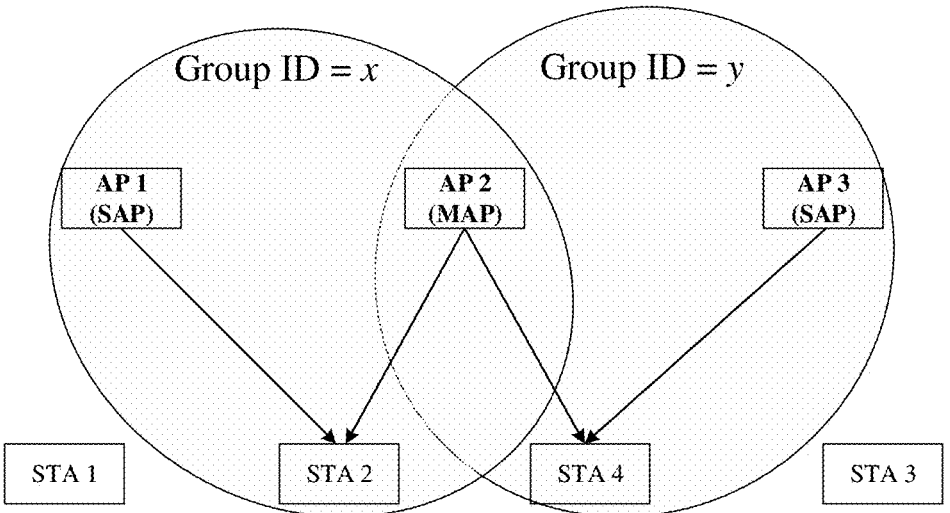
FIG. 25 is a schematic diagram showing a multi-AP coordinated transmission collision according to an embodiment of the present disclosure.

In some scenarios, as shown in FIG. 25, if an AP (for example, AP 2) is assigned to multiple groups and each group needs to serve different STAs, the AP does not know how to deal with it, which may cause multi-AP coordinated transmission collision. In some embodiments, the MAP device may determine a multi-AP transmission priority of the STA device according to priority information of the STA device.

Specifically, the MAP can allocate a multi-AP transmission opportunity according to the priority of the STA. The priority indication (Priority Code) of the STA is included in the Group Setup Response frame transmitted to the MAP by its associated AP (that is, SAP).

Priority Code: Different multi-AP transmission priority windows are set for different STA priorities (such as a). The STA in the corresponding priority window selects a random number as its multi-AP transmission priority within the window (e.g., a smaller number corresponds to a higher/lower priority). This can prevent two STAs from having the same priority, in which case the AP would not know how to serve the STAs.

For example, the multi-AP transmission priority window of a STA with priority a can be set to: (a*n, (a+1)*n], where a and n can be set to integers. For example, n is fixed to 8, and the priority of STA 2 is a=1 and the priority of STA 4 is a=2, then STA 2 randomly selects a number from (8, 16] as its transmission priority; and STA 4 randomly selects a number from (16, 24] as its transmission priority. STA 2 has a higher priority than STA 4, so AP 2 serves STA 2.

Therefore, in the embodiment of the present disclosure, the MAP device transmits the common AP group information, and the STA device recommends an AP group for multi-AP coordinated transmission from the plurality of AP groups included in the common AP group information. That is, the Master Access Point (MAP) initiates the setup of a multi-AP coordination set, such that multi-AP coordinated transmission can be achieved. That is, the MAP device initiates setup of a multi-AP coordination set, divide APs in the network into a number of common AP groups in advance, and assign Group IDs. These Group IDs are consistent for all STAs in the network. Therefore, when the STA requests multi-AP coordinated transmission, it only needs to recommend one or more suitable Group IDs to the MAP device according to its own environment information (such as received signal strength from surrounding APs, etc.), and then the MAP device confirms the best AP group for providing a multi-AP coordinated transmission service for the STA. Considering the mobile environment, when the STA moves, the STA only needs to recommend a new Group ID to the MAP, since the multi-AP coordination set has been configured in advance, which avoids the overhead for re-setting up the multi-AP coordination set every time it moves.

Therefore, in the embodiment of the present disclosure, the MAP device transmits the identifiers of the APs or the identifier of the AP group for multi-AP coordinated transmission with the STA device, and the STA device can directly perform multi-AP coordinated transmission according to the APs or the AP group. That is, the multi-AP coordinated transmission can be performed directly without setting up a multi-AP coordination set.

Therefore, in the embodiment of the present disclosure, for the problem when a certain AP (or APs) is assigned to different groups and then needs to provide different STAs with multi-AP coordinated transmission services, an indication of a priority for the STA to participate in the multi-AP transmission service is added to the Group Setup Response frame, and a corresponding algorithm is designed for this indication, which can alleviate the problem of collision when the AP provides multi-AP coordinated transmission services to different STAs to a certain extent.

The solution of the above Example 1 will be described in detail below with reference to Embodiment 1 and Embodiment 2.

Figure 26:
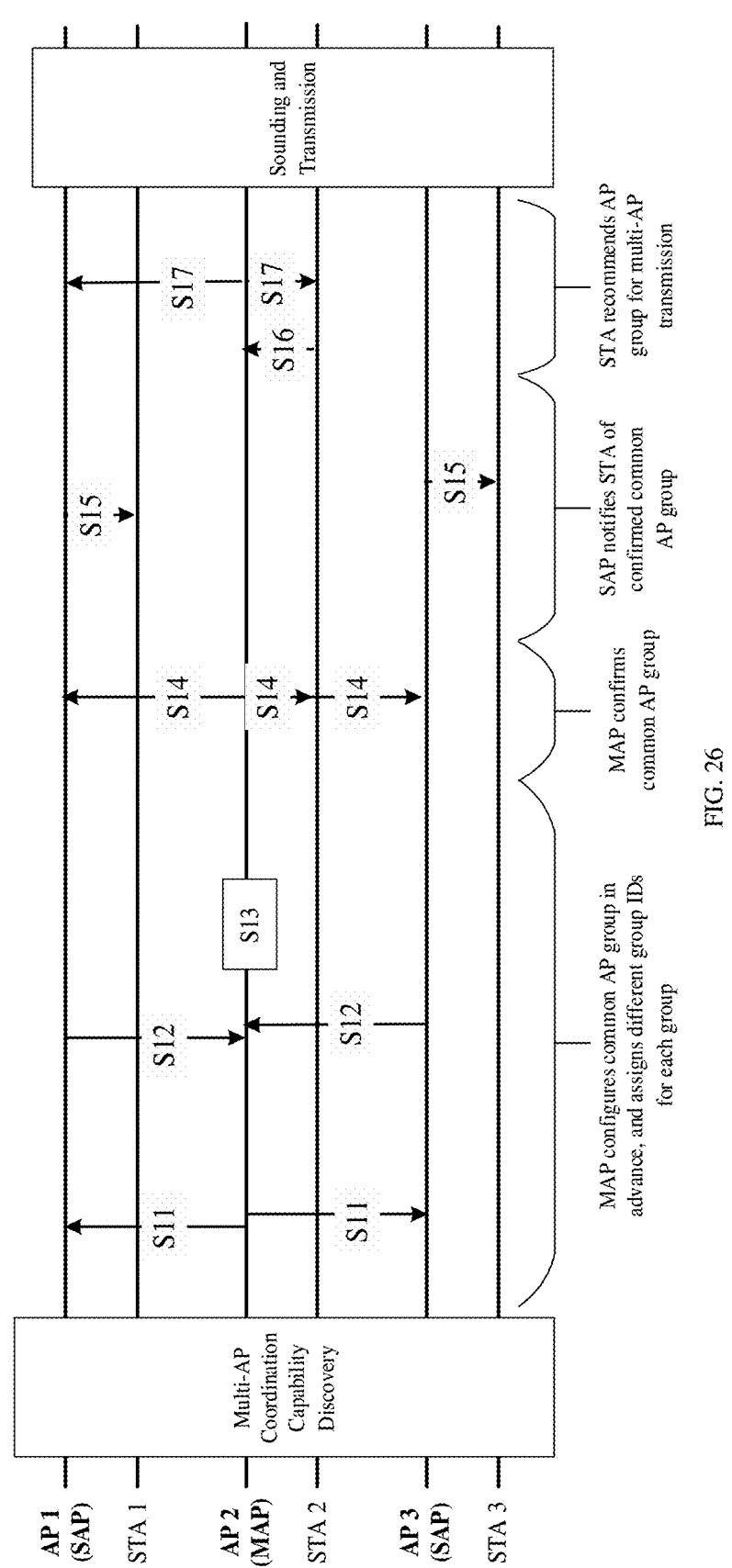
FIG. 26 to FIG. 27 are schematic diagrams showing setup of a multi-AP coordination set initiated by a MAP according to an embodiment of the present disclosure, respectively.
Figure 27:
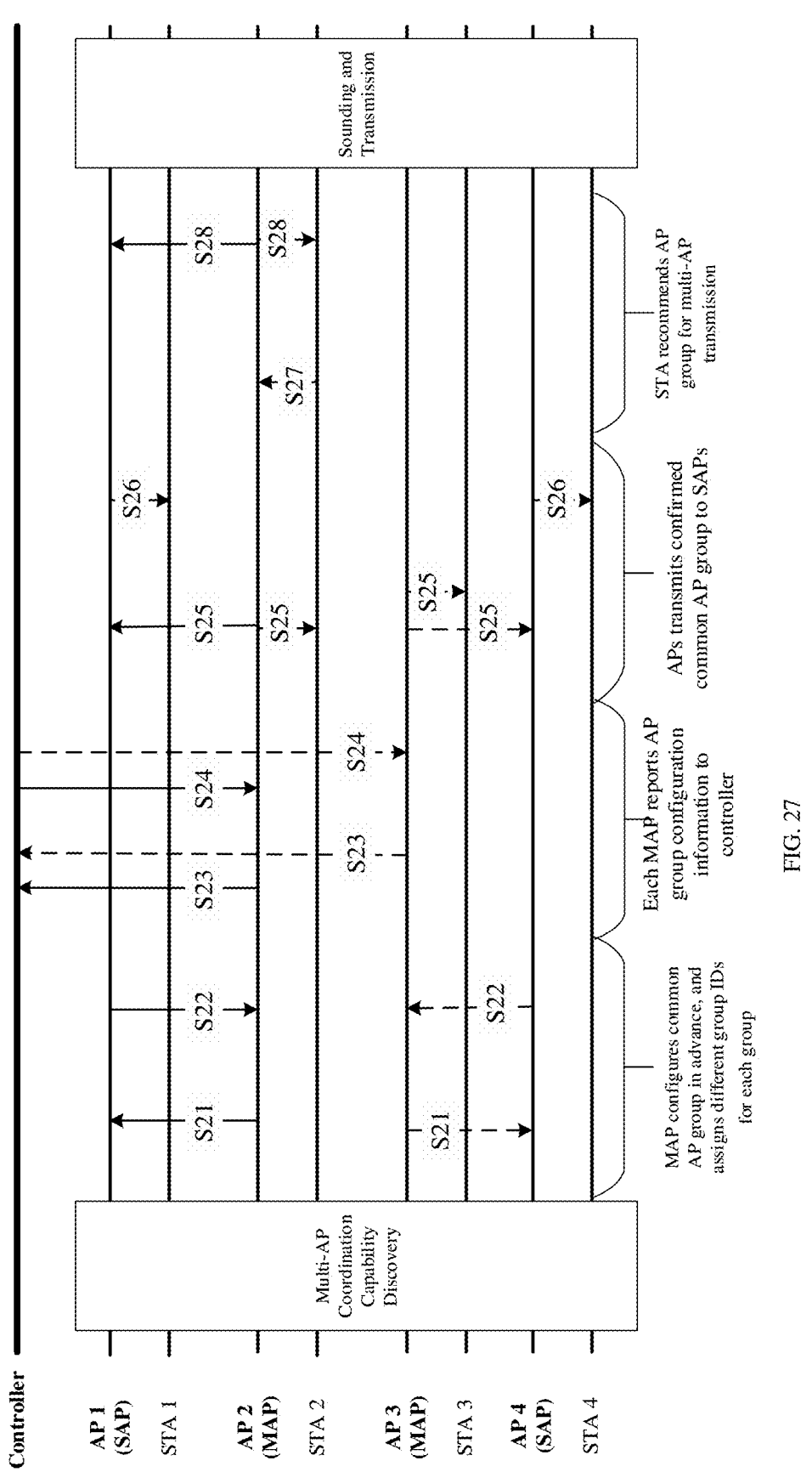

Embodiment 1 corresponds to a scenario where one MAP can cover all SAPs, as shown in FIG. 9 above. The MAP initiates a process of setting up a multi-AP coordination set. As shown in FIG. 26, specifically, a multi-AP coordination set is set up in S11 to S17.

At S11, the MAP pre-configures a plurality of AP groups (Multi-AP Groups) via a Group Setup Request frame, and assigns group IDs (Group IDs).

At S12, the SAP responds to the configuration of the MAP via a Group Setup Response frame, and reports information such as capability information and service priority of its associated STA.

It should be noted that the SAP may approve or reject the group setup request of the MAP.

At S13, the MAP determines common AP group information according to responses from the respective SAPs. The common AP group information includes identifiers of the plurality of AP groups, each of the plurality of AP groups includes one or more APs, and the plurality of AP groups may include a part or all of the pre-configured AP groups.

It should be noted that the common AP group information remains constant and is consistent for all STAs within the coverage.

At S14, the MAP multicasts the common AP group information to each SAP that accepts the group setup request via a Group Setup Confirm frame.

At S15, each SAP transmits the common AP group information to its associated STA.

Specifically, the common AP group information is transmitted to its associated STA, such that the STA can request the AP group to provide a multi-AP coordinated transmission service for it.

At S16, the STA (such as STA2) that needs the multi-AP service recommends one or more AP identifiers from the plurality of AP groups included in the common AP group information to the MAP for the subsequent sounding and transmission stage via a Group Recommend frame.

At S17, the MAP transmits a Group Confirm frame in response to the recommendation of the STA (such as STA2), and the APs corresponding to the AP group identifier indicated by the Group Confirm frame enter the sounding and transmission stage.

It should be noted that the MAP can accept the recommendation of the STA (such as STA2), or can select a more suitable AP group to provide the multi-AP coordinated transmission service for the STA using a related algorithm.

Example 2 corresponds to the scenario where one MAP cannot cover all SAPs, as shown in FIG. 10 above. The MAP initiates a process of setting up a multi-AP coordination set. As shown in FIG. 26, specifically, a multi-AP coordination set is set up in S21 to S28.

At S21, each MAP configures common multi-AP groups within the coverage of the MAP device in advance via a Group Setup Request frame, and assigns Group IDs.

It should be noted that the Common Multi-AP Groups remain constant and are consistent for all STAs within the coverage.

At S22, the SAP responds to the configuration of the MAP via a Group Setup Response frame, and reports information such as capability information and service priority of its associated STA.

It should be noted that the SAP may approve or reject the group setup request of the MAP.

At S23, each MAP feeds back its Common Multi-AP Groups configuration information to a Controller via a Group Setup Report frame.

It should be noted that the Controller obtains global Common Multi-AP Groups information within the coverage of the Controller, for distribution to all APs and STAs in the network.

At S24, the Controller combines the configuration information of each MAP, and transmits the common AP group information to each MAP via a Group Setup Confirm frame. Here, the common AP group information includes identifiers of a plurality of AP groups, and each of the plurality of AP groups includes one or more APs.

At S25, each MAP multicasts the common AP group information to each SAP that accepts the group setup request via a Group Setup Confirm frame.

At S26, each SAP transmits the common AP group information to its associated STA.

Specifically, the common AP group information is transmitted to its associated STA, such that the STA can request the AP group to provide a multi-AP coordinated transmission service for it.

At S27, the STA (such as STA2) that needs multi-AP service recommends one or more AP identifiers from the multiple AP groups included in the common AP group information to the MAP the subsequent sounding and transmission stage via a Group Recommend frame.

At S28, the MAP transmits a Group Confirm frame in response to the recommendation of the STA (such as STA2), and the APs corresponding to the AP group identifier indicated by the Group Confirm frame enter the sounding and transmission stage.

It should be noted that the MAP can accept the recommendation of the STA (such as STA2), or can select a more suitable AP group to provide the multi-AP coordinated transmission service for the STA using a related algorithm.

Figure 28:
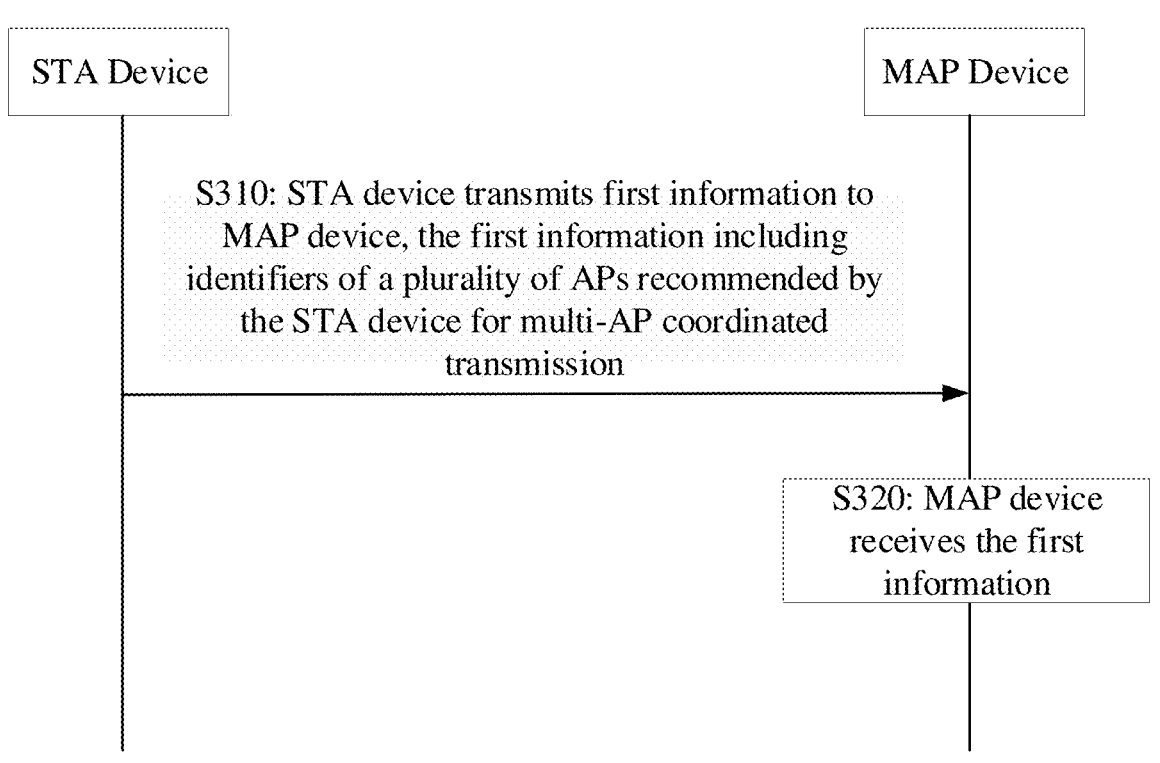
FIG. 28 is a schematic flowchart illustrating another wireless communication method according to an embodiment of the present disclosure.

FIG. 28 is a schematic interaction diagram illustrating a wireless communication method 300 according to an embodiment of the present disclosure. As shown in FIG. 28, the wireless communication method 300 may include at least part of the following content.

At S310, an STA device transmits first information to an MAP device. The first information includes identifiers of a plurality of APs recommended by the STA device for multi-AP coordinated transmission.

At S320, the MAP device receives the first information.

In an embodiment of the present disclosure, the STA device initiates a group setup process. Specifically, the STA device recommends to the MAP device the identifiers of the plurality of APs for multi-AP coordinated transmission.

It should be noted that the "group" in the embodiment of the present disclosure may also be referred to as a "set", and the present disclosure is not limited to this.

In some embodiments, the first information may be transmitted via a group recommend frame. Here, the group recommend frame includes at least a group recommend field, and the group recommend field includes a field indicating a supported type of multi-AP coordinated transmission, a field indicating a number of APs in the plurality of APs, and a field indicating a BSSID of each AP.

It should be noted that, for the group recommend frame carrying the first information, reference may be made to the related description of the second group recommend frame shown in FIG. 14 above, and details thereof will be omitted here.

In some embodiments, the MAP device may transmit second information to the STA device. The second information includes identifiers of APs included in a target AP group, the target AP group is an AP group determined by the MAP device for multi-AP coordinated transmission, and the target AP group includes a part or all of the plurality of APs.

In some embodiments, the second information may instruct the APs included in the target AP group to enter a sounding and transmission stage.

In some embodiments, the second information may be transmitted via a group confirm frame. Here, the group confirm frame includes at least a group confirm field. The group confirm field includes a group identification field of the target AP group, a field indicating a supported type of multi-AP coordinated transmission, a field indicating a number of APs in the target AP group, and a field indicating a BSSID of each AP.

It should be noted that, for the specific description of the group confirm frame carrying the second information, reference may be made to the description in FIG. 13 above, and details thereof will be omitted here.

In some embodiments, the MAP device may transmit third information to the STA device. The third information requests multi-AP transmission capability information.

In some embodiments, the third information may be transmitted via an association request frame. Here, the association request frame includes at least multi-AP transmission capability information, the multi-AP transmission capability information including a multi-AP transmission capability field.

It should be noted that, for the specific description of the association request frame carrying the third information, reference may be made to the description of the association request frame in FIG. 22 above, and details thereof will be omitted here.

In some embodiments, the MAP device may receive fourth information transmitted by the STA device. The fourth information includes confirmation feedback information for the third information.

In some embodiments, the fourth information may be transmitted via an association response frame. Here, the association response frame includes at least multi-AP transmission capability information, the multi-AP transmission capability information including a multi-AP transmission capability field.

It should be noted that, for the specific description of the association response frame carrying the fourth information, reference may be made to the description of the association response frame in FIG. 22 above, and details thereof will be omitted here.

In some embodiments, the MAP device may transmit fifth information to the plurality of APs, the fifth information requesting setup of an AP group for multi-AP coordinated transmission, and the fifth information including identifiers of the plurality of APs. Specifically, the MAP device may determine the target AP group by transmitting the fifth information to the plurality of APs.

In some embodiments, the fifth information may be transmitted via a group setup request frame. The group setup request frame includes at least a group setup request field, the group setup request field includes a group identification field, a field indicating a number of APs in the plurality of APs, a field indicating a BSSID of each AP, and a field indicating a supported type of multi-AP coordinated transmission.

In some embodiments, the MAP device may receive sixth information transmitted by a part or all of the plurality of APs, the sixth information including confirm feedback information for the fifth information.

In some embodiments, the sixth information may include capability information and/or service priority information of an associated STA device.

In some embodiments, the sixth information may be transmitted via a group setup response frame. The group setup response frame includes at least a group setup response field, the group setup response field including an acceptance field, a field indicating a number of STAs, a field indicating a physical address of each STA, a field indicating priority information of each STA, and a field indicating capability information of each STA.

It should be noted that, for the specific description of the group setup response frame carrying the sixth information, reference may be made to the description of the group setup response frame in the wireless communication method 200 above, and details thereof will be omitted here.

In some embodiments, the MAP device may determine target AP group information for multi-AP coordinated transmission with the STA device according to the sixth information, the target AP group information including identifiers of a part or all of the plurality of APs.

In some embodiments, the MAP device may determine a multi-AP transmission priority of the STA device according to priority information of the STA device.

In some embodiments, the MAP device may transmit seventh information to a part or all STA devices within the coverage of the MAP device, the seventh information requesting multi-AP transmission capability information.

In some embodiments, the seventh information may be transmitted via an association request frame. Here, the association request frame includes at least multi-AP transmission capability information, and the multi-AP transmission capability information includes a multi-AP transmission capability field.

It should be noted that, for the specific description of the association request frame carrying the seventh information, reference may be made to the description of the association request frame in the wireless communication method 200 above, and details thereof will be omitted here.

In some embodiments, the MAP device may receive eighth information transmitted by at least one STA device within the coverage of the MAP device, the eighth information including confirmation feedback information for the seventh information.

In some embodiments, the eighth information may be transmitted via an association response frame. The association response frame includes at least multi-AP transmission capability information, and the multi-AP transmission capability information includes a multi-AP transmission capability field.

It should be noted that, for the specific description of the association response frame for sending the eighth information, reference may be made to the description of the association response frame in the wireless communication method 200 above, and details thereof will be omitted here.

In some embodiments, the MAP device may exchange ninth information with at least one SAP device within the coverage of the MAP device, the ninth information including multi-AP transmission capability information.

In some embodiments, the ninth information may be transmitted via a beacon frame. The beacon frame includes at least multi-AP transmission capability information, and the multi-AP transmission capability information includes a multi-AP transmission capability field.

It should be noted that, for the specific description of the beacon frame carrying the ninth information, reference may be made to the description of the beacon frame in the wireless communication method 200 above, and details thereof will be omitted here.

In some embodiments, the specific process of the multi-AP coordination capability discovery stage may be shown in FIG. 24, and the multi-AP coordination capability information may be exchanged between the AP and the STA via an Association Request frame or an Association Response frame. The APs can learn the multi-AP coordination capability information of each other by receiving beacon frames from each other. Specifically, a Multi-AP Transmission Capability element can be added in the Association Request frame, Association Response frame, and beacon frame, or a Multi-AP Transmission Capability field can be added in the reserved bits of the Association Request frame, Association Response frame, and beacon frame.

In an embodiment of the present disclosure, for the STA-initiated multi-AP coordination set setup solution, in a relatively static environment, the STA can recommend surrounding APs to set up a multi-AP coordination set according to environment information (such as received signal strengths from surrounding APs, etc.), and then perform multi-AP coordinated transmission. In addition, when the common multi-AP coordination set pre-configured by the network is not applicable to a certain STA or STAs, the STA(s) can autonomously recommend a suitable AP to re-set up an AP group and assign a new group ID.

In some scenarios, as shown in FIG. 25, if an AP (for example, AP 2) is assigned to multiple groups and each group needs to serve different STAs, the AP does not know how to deal with it, which may cause multi-AP coordinated transmission collision. In some embodiments, the MAP device may determine a multi-AP transmission priority of the STA device according to priority information of the STA device.

Specifically, the MAP can allocate a multi-AP transmission opportunity according to the priority of the STA. The priority indication (Priority Code) of the STA is included in the Group Setup Response frame transmitted to the MAP by its associated AP (that is, SAP).

Priority Code: Different multi-AP transmission priority windows are set for different STA priorities (such as a). The STA in the corresponding priority window selects a random number as its multi-AP transmission priority within the window (e.g., a smaller number corresponds to a higher/ lower priority). This can prevent two STAs from having the same priority, in which case the AP would not know how to serve the STAs.

For example, the multi-AP transmission priority window of a STA with priority a can be set to: $(a*n, (a+1)*n]$, where a and n can be set to integers. For example, n is fixed to 8, and the priority of STA 2 is a=1 and the priority of STA 4 is a=2, then STA 2 randomly selects a number from $(8, 16]$ as its transmission priority; and STA 4 randomly selects a number from $(16, 24]$ as its transmission priority. STA 2 has a higher priority than STA 4, so AP 2 serves STA 2.

Therefore, for the problem when a certain AP (or APs) is assigned to different groups and then needs to provide different STAs with multi-AP coordinated transmission services, an indication of a priority for the STA to participate in the multi-AP transmission service is added to the Group Setup Response frame, and a corresponding algorithm is designed for this indication, which can alleviate the problem of collision when the AP provides multi-AP coordinated transmission services to different STAs to a certain extent.

The above solution of the STA initiating setup of a multi-AP set will be described in detail below with reference to Embodiment 3.

Figure 29:
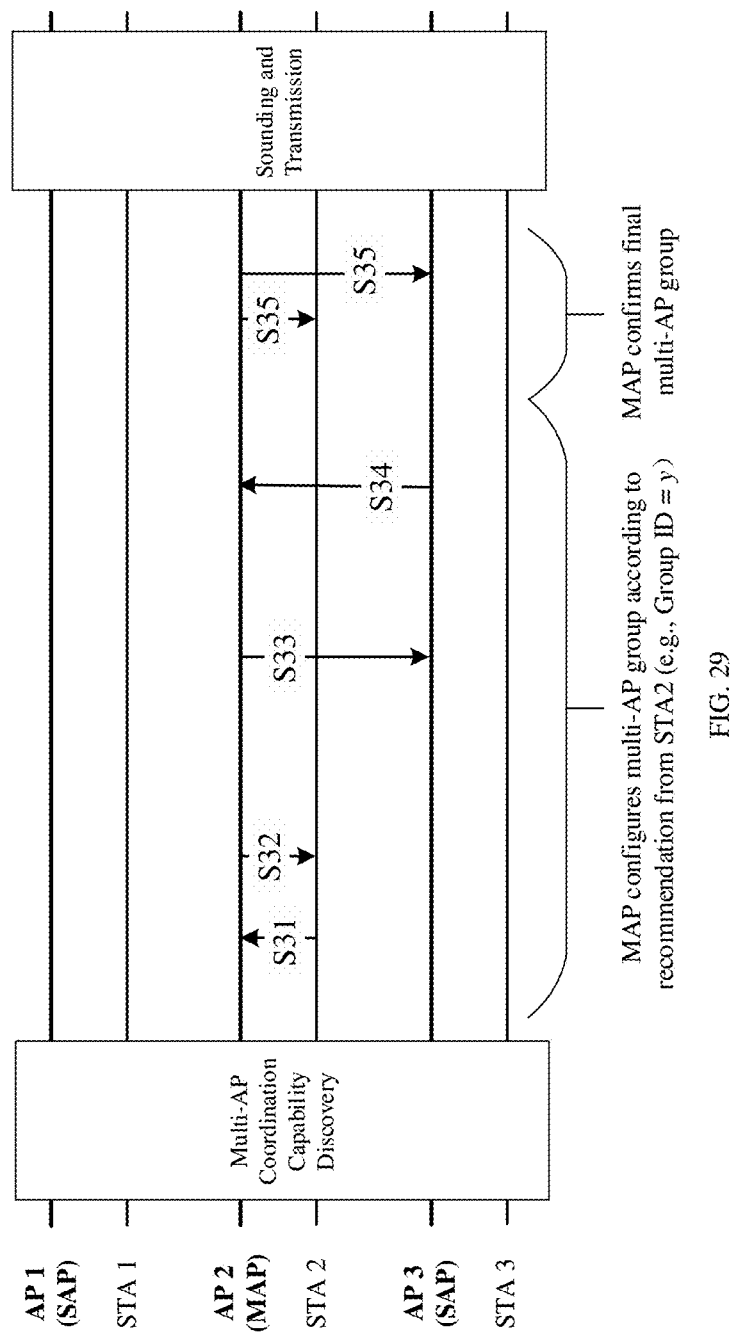
FIG. 29 is a schematic diagram showing an STA initiating setup of a multi-AP coordination set according to an embodiment of the present disclosure.

Embodiment 3 can correspond to a scenario where one MAP can cover all SAPs, that is, the scenario shown in FIG. 9 above. It can also correspond to a scenario where one MAP cannot cover all SAPs, that is, the scenario shown in FIG. 10 above. The STA initiates a process of setting up a multi-AP coordination set. As shown in FIG. 29, specifically, a multi-AP coordination set is set up in S31 to S35.

At S31, STA2 transmits a Group Recommend frame to recommend APs to its associated MAP (that is, AP 2).

At S32, the MAP responds to the recommendation of STA2 via an Acknowledgement (Ack) frame.

At S33, the MAP transmits a Group Setup Request frame to set up a multi-AP group according to the recommendation of STA2, and allocates a Group ID.

At S34, the SAP responds to the Group Setup Request of the MAP with a Group Setup Response frame.

Note: The SAP may approve or reject the Group Setup Request from the MAP. If rejected, the MAP needs to finally confirm the assigned Multi-AP Group information.

At S35, the MAP multicasts the final Multi-AP Group information to STA2 and the SAP that accepts the Group Setup Request via a Group Setup Confirm frame, and the APs corresponding to the Group ID indicated by the Group Confirm frame enters the sounding and transmission stage.

Therefore, in the embodiment of the present disclosure, the STA device recommends to the MAP device the identifiers of the plurality of APs for multi-AP coordinated transmission, so as to set up a multi-AP coordinated set. That is, the STA device initiates the setup of the multi-AP coordination set, so as to achieve multi-AP coordinated transmission.

In an embodiment of the present disclosure, for the STA-initiated multi-AP coordination set setup solution, in a relatively static environment, the STA can recommend surrounding APs to set up a multi-AP coordination set according to environment information (such as received signal strengths from surrounding APs, etc.), and then perform multi-AP coordinated transmission. In addition, when the common multi-AP coordination set pre-configured by the network is not applicable to a certain STA or STAs, the STA(s) can autonomously recommend a suitable AP to re-set up an AP group and assign a new group ID.

In the embodiment of the present disclosure, for the problem when a certain AP (or APs) is assigned to different groups and then needs to provide different STAs with multi-AP coordinated transmission services, an indication of a priority for the STA to participate in the multi-AP transmission service is added to the Group Setup Response frame, and a corresponding algorithm is designed for this indication, which can alleviate the problem of collision when the AP provides multi-AP coordinated transmission services to different STAs to a certain extent.

The method embodiments of the present disclosure have been described in detail above with reference to FIGS. 8-29, and the apparatus embodiments of the present disclosure will be described in detail below with reference to FIGS. 30-33. It can be appreciated that the apparatus embodiments and the method embodiments correspond to each other, and for similar descriptions, reference can be made to the method embodiments.

Figure 30:
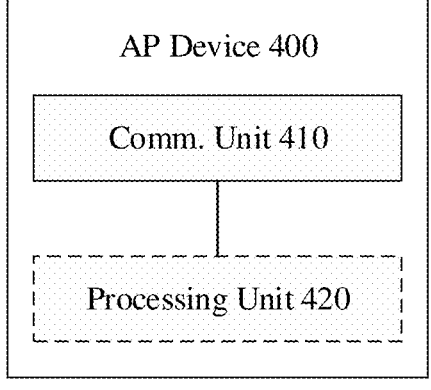
FIG. 30 is a schematic block diagram of an access point device according to an embodiment of the present disclosure.

FIG. 30 shows a schematic block diagram of an access point device 400 according to an embodiment of the present disclosure. The access point device 400 is a MAP device. As shown in FIG. 30, the access point device 400 includes: a communication unit 410 configured to transmit first information.

The first information includes common Access Point (AP) group information, the common AP group information including identifiers of a plurality of AP groups, each of the plurality of AP groups including one or more APs; or the first information includes identifiers of APs or an identifier of an AP group for multi-AP coordinated transmission with a Station (STA) device.

In some embodiments, the first information may include the common AP group information, and the communication unit 410 may be further configured to receive second information transmitted by the STA device, the second information including an identifier of at least one AP group recommended by the STA device for multi-AP coordinated transmission from the plurality of AP groups.

In some embodiments, the second information may be transmitted via a first group recommend frame; and the first group recommend frame may include at least a group recommend field, the group recommend field may include at least one group information field and a field indicating a number of AP groups in the at least one AP group, the at least one group information field may correspond to the at least one AP group, respectively, and each of the at least one group information field may include an identification field indicating the corresponding AP group and a field indicating a supported type of multi-AP coordinated transmission.

In some embodiments, the communication unit 410 may be further configured to transmit third information to the STA device and/or the one or more APs in the at least one AP group, the third information including an identifier of the at least one AP group.

In some embodiments, the third information may instruct the one or more APs in the at least one AP group to enter a sounding and transmission stage.

In some embodiments, the third information may be transmitted via a group confirm frame; and the group confirm frame may include at least a group confirm field, and the group confirm field may include a group identification field, a field indicating a supported type of multi-AP coordinated transmission, a field indicating a number of APs in the group, and a field indicating a Basic Service Set Identifier (BSSID) of each AP.

In some embodiments, the first information may include the common AP group information, and the access point device 400 may further include: a processing unit 420. The communication unit 410 may be further configured to receive fourth information transmitted by the STA device, the fourth information including identifiers of a plurality of APs recommended by the STA device for multi-AP coordinated transmission; and the processing unit 420 may be configured to initiate a group setup request according to the fourth information, to obtain target AP group information including identifiers of a part or all of the plurality of APs.

In some embodiments, the fourth information may be transmitted via a second group recommend frame; and the second group recommend frame may include at least a group recommend field, and the group recommend field may include a field indicating a supported type of multi-AP coordinated transmission, a field indicating a number of APs in the plurality of APs, and a field indicating a BSSID of each AP.

In some embodiments, the communication unit 410 may be further configured to transmit fifth information to the STA device and/or the one or more APs included in the target AP group information, the fifth information including an identifier of each AP included in the target AP group information.

In some embodiments, the fifth information may instruct each AP included in the target AP group information to enter a sounding and transmission stage.

In some embodiments, the fifth information may be transmitted via a group confirm frame, and the group confirm frame may include at least a group confirm field, and the group confirm field may include a group identification field of the target AP group, a field indicating a supported type of multi-AP coordinated transmission, a field indicating a number of APs in the target AP group, and a field indicating a BSSID of each AP.

In some embodiments, the communication unit may be configured to transmit the first information to at least one Slave Access Point (SAP) device within its coverage.

In some embodiments, the first information may be transmitted via a group setup confirm frame; and the group setup confirm frame may include at least a group setup confirm field, and the group setup confirm field may include a plurality of group information fields and a field indicating a number of AP groups in the plurality of AP groups, and the plurality of group information fields may correspond to the plurality of AP groups, respectively, and each of the plurality of group information fields may include an identification field indicating the corresponding AP group, a field indicating a supported type of multi-AP coordinated transmission, a field indicating a number of APs in the group, and a field indicating a BSSID of each AP.

In some embodiments, the communication unit 410 may be further configured to transmit sixth information to a part or all SAP devices within its coverage, the sixth information requesting setup of a common multi-AP group, and the sixth information including AP groups pre-configured by the MAP device and their respective group identifiers.

In some embodiments, the sixth information may be transmitted via a group setup request frame; and the group setup request frame may include at least a group setup request field, the group setup request field may include a plurality of group information fields and a field indicating a number of AP groups in the pre-configured AP groups, the plurality of group information fields may correspond to the pre-configured AP groups, respectively, and each of the plurality of group information fields may include an identification field indicating the corresponding AP group, a field indicating a supported type of multi-AP coordinated transmission, a field indicating a number of APs in the group, and a field indicating a BSSID of each AP.

In some embodiments, the communication unit 410 may be further configured to receive seventh information transmitted by at least one SAP device within its coverage, the seventh information including confirmation feedback information for the sixth information.

In some embodiments, the seventh information may include STA device capability information and/or service priority information associated with each of the at least one SAP device.

In some embodiments, the seventh information may be transmitted via a group setup response frame; and the group setup response frame may include at least a group setup response field, the group setup response field including an acceptance field, a field indicating a number of STAs, a field indicating a physical address of each STA, a field indicating priority information of each STA, and a field indicating capability information of each STA.

In some embodiments, the access point device 400 may further include: a processing unit 420.

The processing unit 420 may be configured to determine the common AP group information according to the seventh information.

In some embodiments, the communication unit 410 may be further configured to transmit eighth information to a controller according to the seventh information, the eighth information including AP groups pre-configured by the MAP device and their respective group identifiers.

In some embodiments, the eighth information may be transmitted via a group setup report frame; and the group setup report frame may include at least a group setup report field, the group setup report field may include a plurality of group information fields and a field indicating a number of AP groups in the pre-configured AP groups, the plurality of group information fields may correspond to the pre-configured AP groups, respectively, and each of the plurality of group information fields may include an identification field indicating the corresponding AP group, a field indicating a supported type of multi-AP coordinated transmission, a field indicating a number of APs in the group, and a field indicating a BSSID of each AP.

In some embodiments, the communication unit 410 may be further configured to receive ninth information transmitted by the controller, the ninth information including the common AP group information.

In some embodiments, the first information may include the identifiers of the APs or the identifier of the AP group for multi-AP coordinated transmission with the STA device, and the communication unit 410 may be configured to transmit the first information to the STA device and/or the APs or APs in the AP group for multi-AP coordinated transmission with the STA device.

In some embodiments, the first information may be transmitted via a group recommend frame; and the group recommend frame may include at least a group recommend field, and the group recommend field may include a field indicating a supported type of multi-AP coordinated transmission, a field indicating the identifiers of the APs or the identifier of the AP group for multi-AP coordinated transmission with the STA device, and a field indicating a BSSID of each AP.

In some embodiments, the first information may be transmitted via a group confirm frame; and the group confirm frame may include at least a group confirm field, and the group confirm field may include a field indicating a supported type of multi-AP coordinated transmission and a field indicating a BSSID of each AP for multi-AP coordinated transmission with the STA device, or the group confirm field may include a field indicating a supported type of multi-AP coordinated transmission, a field indicating the identifier of the AP group for multi-AP coordinated transmission with the STA device, and a field indicating a BSSID of each AP.

In some embodiments, the access point device 400 may further include: a processing unit 420.

The processing unit 420 is configured to determine a multi-AP transmission priority of the STA device according to priority information of the STA device.

In some embodiments, the communication unit 410 may be further configured to transmit tenth information to a part or all SAP devices within its coverage, the tenth information requesting multi-AP transmission capability information.

In some embodiments, the tenth information may be transmitted via an association request frame; and the association request frame may include at least multi-AP transmission capability information, the multi-AP transmission capability information including a multi-AP transmission capability field.

In some embodiments, the communication unit 410 may be further configured to receive eleventh information transmitted by at least one STA device within its coverage, the eleventh information including confirmation feedback information for the tenth information.

In some embodiments, the eleventh information may be transmitted via an association response frame; and the association response frame may include at least multi-AP transmission capability information, the multi-AP transmission capability information including a multi-AP transmission capability field.

In some embodiments, the communication unit 410 may be further configured to exchange twelfth information with at least one SAP device within its coverage, the twelfth information including multi-AP transmission capability information.

In some embodiments, the twelfth information may be transmitted via a beacon frame; and the beacon frame may include at least multi-AP transmission capability information, the multi-AP transmission capability information including a multi-AP transmission capability field.

Optionally, in some embodiments, the above communication unit may be a communication interface or a transceiver, or an input/output interface of a communication chip or a system-on-chip. The above processing unit may be one or more processors.

It can be appreciated that the access point device 400 according to the embodiment of the present disclosure may correspond to the access point device in the method embodiment of the present disclosure, and the above and other operations and/or functions of the respective units in the access point device 400 are provided for the purpose of implementing the process flow corresponding to the MAP device in the method 200 shown in FIG. 8, and details thereof will be not omitted here for brevity.

Figure 31:
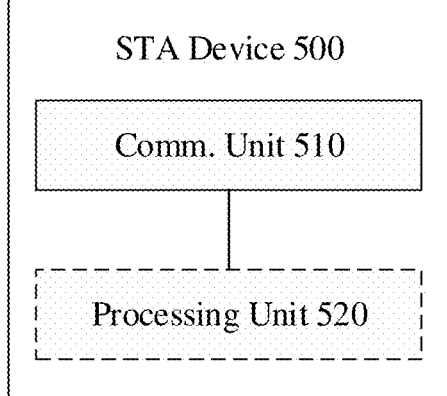
FIG. 31 is a schematic block diagram of a station device according to an embodiment of the present disclosure.

FIG. 31 is a schematic block diagram of a station device according to an embodiment of the present disclosure. As shown in FIG. 31, the station device 500 includes a communication unit 510 configured to receive first information.

The first information includes common Access Point (AP) group information, the common AP group information including identifiers of a plurality of AP groups, each of the plurality of AP groups including one or more APs; or the first information includes identifiers of APs or an identifier of an AP group for multi-AP coordinated transmission with the STA device.

In some embodiments, the first information may include the common AP group information, and the communication unit 510 may be further configured to transmit second information to a Master Access Point (MAP) device, the second information including an identifier of at least one AP group recommended by the STA device for multi-AP coordinated transmission from the plurality of AP groups.

In some embodiments, the second information may be transmitted via a first group recommend frame; and the first group recommend frame may include at least a group recommend field, the group recommend field may include at least one group information field and a field indicating the number of AP groups in the at least one AP group, the at least one group information field may correspond to the at least one AP group, respectively, and each of the at least one group information field may include an identification field indicating the corresponding AP group and a field indicating a supported type of multi-AP coordinated transmission.

In some embodiments, the communication unit 510 may be further configured to receive third information transmitted by the MAP device, the third information including an identifier of the at least one AP group.

In some embodiments, the third information may instruct the one or more APs in the at least one AP group to enter a sounding and transmission stage.

In some embodiments, the third information may be transmitted via a group confirm frame; and the group confirm frame may include at least a group confirm field, and the group confirm field may include a group identification field, a field indicating a supported type of multi-AP coordinated transmission, a field indicating a number of APs in the group, and a field indicating a Basic Service Set Identifier (BSSID) of each AP.

In some embodiments, the first information may include the common AP group information, and the STA device 500 may further include: a processing unit 520.

The processing unit 520 may be configured to determine that the plurality of AP groups in the common AP group information are not suitable for multi-AP coordinated transmission; and the communication unit 510 may be further configured to transmit fourth information to the MAP device, the fourth information including identifiers of a plurality of APs recommended by the STA device for multi-AP coordinated transmission.

In some embodiments, the fourth information may be transmitted via a second group recommend frame; and the second group recommend frame may include at least a group recommend field, and the group recommend field may include a field indicating a supported type of multi-AP coordinated transmission, a field indicating a number of APs in the plurality of APs, and a field indicating a BSSID of each AP.

In some embodiments, the communication unit 510 may be further configured to receive fifth information transmitted by the MAP device, the fifth information including an identifier of each AP included in a target AP group, the target AP group being determined by the MAP device as an AP group for multi-AP coordinated transmission, the target AP group including a part or all of the plurality of APs.

In some embodiments, the fifth information may instruct each AP included in the target AP group to enter a sounding and transmission stage.

In some embodiments, the fifth information may be transmitted via a group confirm frame, and the group confirm frame may include at least a group confirm field, and the group confirm field may include a group identification field of the target AP group, a field indicating a supported type of multi-AP coordinated transmission, a field indicating a number of APs in the target AP group, and a field indicating a BSSID of each AP.

In some embodiments, the first information may include the identifiers of the APs or the identifier of the AP group for multi-AP coordinated transmission with the STA device, and the communication unit 510 may be configured to receive the first information transmitted by the MAP device.

In some embodiments, the first information may be transmitted via a group recommend frame; and the group recommend frame may include at least a group recommend field, and the group recommend field may include a field indicating a supported type of multi-AP coordinated transmission, a field indicating the identifiers of the APs or the identifier of the AP group for multi-AP coordinated transmission with the STA device, and a field indicating a BSSID of each AP.

In some embodiments, the first information may be transmitted via a group confirm frame; and the group confirm frame may include at least a group confirm field, and the group confirm field may include a field indicating a supported type of multi-AP coordinated transmission and a field indicating a BSSID of each AP for multi-AP coordinated transmission with the STA device, or the group confirm field may include a field indicating a supported type of multi-AP coordinated transmission, a field indicating the identifier of the AP group for multi-AP coordinated transmission with the STA device, and a field indicating a BSSID of each AP.

In some embodiments, the communication unit 510 may be further configured to receive tenth information transmitted by the MAP device, the tenth information requesting multi-AP transmission capability information.

In some embodiments, the tenth information may be transmitted via an association request frame; and the association request frame may include at least multi-AP transmission capability information, the multi-AP transmission capability information including a multi-AP transmission capability field.

In some embodiments, the communication unit 510 may be further configured to transmit eleventh information to the MAP device, the eleventh information including confirmation feedback information for the tenth information.

In some embodiments, the eleventh information may be transmitted via an association response frame; and the association response frame may include at least multi-AP transmission capability information, the multi-AP transmission capability information including a multi-AP transmission capability field.

Optionally, in some embodiments, the above communication unit may be a communication interface or a transceiver, or an input/output interface of a communication chip or a system-on-chip. The above processing unit may be one or more processors.

It can be appreciated that the station device 500 according to the embodiment of the present disclosure may correspond to the station device in the method embodiment of the present disclosure, and the above and other operations and/or functions of the respective units in the station device 500 are provided for the purpose of implementing the process flow corresponding to the STA device in the method 200 shown in FIG. 8, and details thereof will be not omitted here for brevity.

FIG. 32 is a schematic block diagram of an access point device 600 according to an embodiment of the present disclosure. The access point device 600 is a MAP device. As shown in FIG. 32, the access point device 600 includes a communication unit 610 configured to receive first information transmitted by a Station (STA) device.

The first information includes identifiers of a plurality of APs recommended by the STA device for multi-AP coordinated transmission.

In some embodiments, the first information may be transmitted via a group recommend frame; and the group recommend frame may include at least a group recommend field, and the group recommend field may include a field indicating a supported type of multi-AP coordinated transmission, a field indicating a number of APs in the plurality of APs, and a field indicating a Basic Service Set Identifier (BSSID) of each AP.

In some embodiments, the communication unit 610 may be further configured to transmit second information to the STA device, the second information including identifiers of APs included in a target AP group, the target AP group being an AP group determined by the MAP device for multi-AP coordinated transmission, the target AP group including a part or all of the plurality of APs.

In some embodiments, the second information may instruct the APs included in the target AP group to enter a sounding and transmission stage.

In some embodiments, the second information may be transmitted via a group confirm frame; and the group confirm frame may include at least a group confirm field, the group confirm field may include a group identification field of the target AP group, a field indicating a supported type of multi-AP coordinated transmission, a field indicating a number of APs in the target AP group, and a field indicating a BSSID of each AP.

In some embodiments, the communication unit 610 may be further configured to transmit third information to the STA device, the third information requesting multi-AP transmission capability information.

In some embodiments, the third information may be transmitted via an association request frame; and the association request frame may include at least multi-AP transmission capability information, the multi-AP transmission capability information including a multi-AP transmission capability field.

In some embodiments, the communication unit 610 may be further configured to receive fourth information transmitted by the STA device, the fourth information including confirmation feedback information for the third information.

In some embodiments, the fourth information may be transmitted via an association response frame; and the association response frame may include at least multi-AP transmission capability information, the multi-AP transmission capability information including a multi-AP transmission capability field.

In some embodiments, the communication unit 610 may be further configured to transmit fifth information to the plurality of APs, the fifth information requesting setup of an AP group for multi-AP coordinated transmission, and the fifth information including identifiers of the plurality of APs.

In some embodiments, the fifth information may be transmitted via a group setup request frame; and the group setup request frame may include at least a group setup request field, the group setup request field may include a group identification field, a field indicating a number of APs in the plurality of APs, a field indicating a BSSID of each AP, and a field indicating a supported type of multi-AP coordinated transmission.

In some embodiments, the communication unit 610 may be further configured to receive sixth information transmitted by a part or all of the plurality of APs, the sixth information including confirm feedback information for the fifth information.

In some embodiments, the sixth information may include capability information and/or service priority information of an associated STA device.

In some embodiments, the sixth information may be transmitted via a group setup response frame; and the group setup response frame may include at least a group setup response field, the group setup response field including an acceptance field, a field indicating the number of STAs, a field indicating a physical address of each STA, a field indicating priority information of each STA, and a field indicating capability information of each STA.

In some embodiments, the access point device 600 may further include: a processing unit 620.

The processing unit 620 may be configured to determine target AP group information for multi-AP coordinated transmission with the STA device according to the sixth information, the target AP group information including identifiers of a part or all of the plurality of APs.

In some embodiments, the access point device 600 may further include: a processing unit 620.

the processing unit 620 may be configured to determine a multi-AP transmission priority of the STA device according to priority information of the STA device.

In some embodiments, the communication unit 610 may be further configured to transmit seventh information to a part or all STA devices within its coverage, the seventh information requesting multi-AP transmission capability information.

In some embodiments, the seventh information may be transmitted via an association request frame; and the association request frame may include at least multi-AP transmission capability information, and the multi-AP transmission capability information may include a multi-AP transmission capability field.

In some embodiments, the communication unit 610 may be further configured to receive eighth information transmitted by at least one STA device within its coverage, the eighth information including confirmation feedback information for the seventh information.

In some embodiments, the eighth information may be transmitted via an association response frame; and the association response frame may include at least multi-AP transmission capability information, and the multi-AP transmission capability information may include a multi-AP transmission capability field.

In some embodiments, the communication unit 610 may be further configured to exchange ninth information with at least one SAP device within its coverage, the ninth information including multi-AP transmission capability information.

In some embodiments, the ninth information may be transmitted via a beacon frame; and the beacon frame may include at least multi-AP transmission capability information, and the multi-AP transmission capability information may include a multi-AP transmission capability field.

Optionally, in some embodiments, the above communication unit may be a communication interface or a transceiver, or an input/output interface of a communication chip or a system-on-chip. The above processing unit may be one or more processors.

It can be appreciated that the access point device 600 according to the embodiment of the present disclosure may correspond to the access point device in the method embodiment of the present disclosure, and the above and other operations and/or functions of the respective units in the access point device 600 are provided for the purpose of implementing the process flow corresponding to the MAP device in the method 300 shown in FIG. 28, and details thereof will be not omitted here for brevity.

FIG. 33 is a schematic block diagram of a station device 700 according to an embodiment of the present disclosure. As shown in FIG. 33, the station device 700 includes a communication unit 710 configured to transmit first information to a Master Access Point (MAP) device.

The first information includes identifiers of a plurality of APs recommended by the STA device for multi-AP coordinated transmission.

In some embodiments, the first information may be transmitted via a group recommend frame; and the group recommend frame may include at least a group recommend field, and the group recommend field may include a field indicating a supported type of multi-AP coordinated transmission, a field indicating a number of APs in the plurality of APs, and a field indicating a Basic Service Set Identifier (BSSID) of each AP.

In some embodiments, the communication unit 710 may be further configured to receive the second information transmitted by the MAP device, the second information including identifiers of APs included in a target AP group, the target AP group being an AP group determined by the MAP device for multi-AP coordinated transmission, the target AP group including a part or all of the plurality of APs.

In some embodiments, the second information may instruct the APs included in the target AP group to enter a sounding and transmission stage.

In some embodiments, the second information may be transmitted via a group confirm frame; and the group confirm frame may include at least a group confirm field, the group confirm field may include a group identification field of the target AP group, a field indicating a supported type of multi-AP coordinated transmission, a field indicating a number of APs in the target AP group, and a field indicating a BSSID of each AP.

In some embodiments, the communication unit 710 may be further configured to receive third information transmitted by the MAP device, the third information requesting multi-AP transmission capability information.

In some embodiments, the third information may be transmitted via an association request frame; and the association request frame may include at least multi-AP transmission capability information, the multi-AP transmission capability information including a multi-AP transmission capability field.

In some embodiments, the communication unit 710 may be further configured to transmit fourth information to the MAP device, the fourth information including confirmation feedback information for the third information.

In some embodiments, the fourth information may be transmitted via an association response frame; and the association response frame may include at least multi-AP transmission capability information, the multi-AP transmission capability information including a multi-AP transmission capability field.

Optionally, in some embodiments, the above communication unit may be a communication interface or a transceiver, or an input/output interface of a communication chip or a system-on-chip. The above processing unit may be one or more processors.

It can be appreciated that the station device 700 according to the embodiment of the present disclosure may correspond to the station device in the method embodiment of the present disclosure, and the above and other operations and/or functions of the respective units in the station device 700 are provided for the purpose of implementing the process flow corresponding to the STA device in the method 300 shown in FIG. 28, and details thereof will be not omitted here for brevity.

FIG. 34 is a schematic diagram showing a structure of a communication device 800 according to an embodiment of the present disclosure. The communication device 800 shown in FIG. 34 includes a processor 810, and the processor 810 can invoke and execute a computer program from a memory to implement the method in the embodiment of the present disclosure.

In some embodiments, as shown in FIG. 34, the communication device 800 may further include a memory 820. The processor 810 can invoke and execute a computer program from the memory 820 to implement the method in the embodiment of the present disclosure.

The memory 820 may be a separate device independent from the processor 810, or may be integrated in the processor 810.

In some embodiments, as shown in FIG. 34, the communication device 800 may further include a transceiver 830, and the processor 810 may control the transceiver 830 to communicate with other devices, and in particular, transmit information or data to other devices, or receive information or data transmitted by other devices.

Here, the transceiver 830 may include a transmitter and a receiver. The transceiver 630 may further include one or more antennas.

In some embodiments, the communication device 800 may specifically be the access point device according to the embodiment of the present disclosure, and the communication device 800 may implement the corresponding processes implemented by the access point device in any of the methods according to the embodiments of the present disclosure. For the sake of brevity, details thereof will be omitted here.

In some embodiments, the communication device 800 may specifically be the station device according to the embodiment of the present disclosure, and the communication device 800 may implement the corresponding processes implemented by the station device in any of the methods according to the embodiments of the present disclosure. For the sake of brevity, details thereof will be omitted here.

Figure 35:
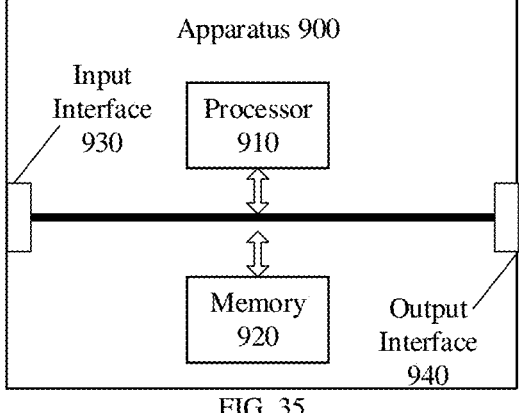
FIG. 35 is a schematic block diagram of an apparatus according to an embodiment of the present disclosure.

FIG. 35 is a schematic diagram showing a structure of an apparatus according to an embodiment of the present disclosure. The apparatus 900 shown in FIG. 35 includes a processor 910, and the processor 910 can invoke and execute a computer program from a memory to implement the method in the embodiment of the present disclosure.

In some embodiments, as shown in FIG. 35, the apparatus 900 may further include a memory 920. The processor 910 can invoke and execute a computer program from the memory 920 to implement the method in the embodiment of the present disclosure.

The memory 920 may be a separate device independent from the processor 910, or may be integrated in the processor 910.

In some embodiments, the apparatus 900 may further include an input interface 930. The processor 910 can control the input interface 930 to communicate with other devices or chips, and in particular, obtain information or data transmitted by other devices or chips.

In some embodiments, the apparatus 900 may further include an output interface 940. The processor 910 can control the output interface 940 to communicate with other devices or chips, and in particular, output information or data to other devices or chips.

In some embodiments, the apparatus can be applied to the access point device in the embodiment of the present disclosure, and the apparatus can implement the corresponding processes implemented by the access point device in the various methods of the embodiments of the present disclosure. For the sake of brevity, details thereof will be omitted here.

In some embodiments, the apparatus can be applied to the station device in the embodiment of the present disclosure, and the apparatus can implement the corresponding processes implemented by the station device in the various methods of the embodiments of the present disclosure. For the sake of brevity, details thereof will be omitted here.

In some embodiments, the apparatus in the embodiment of the present disclosure may be a chip, such as a system-level chip, a system-chip, a chip system, or a system-on-chip.

Figure 36:
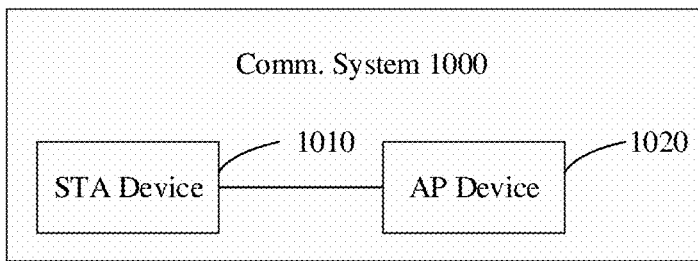
FIG. 36 is a schematic block diagram of a communication system according to an embodiment of the present disclosure.

FIG. 36 is a schematic block diagram showing a communication system 1000 according to an embodiment of the present disclosure. As shown in FIG. 36, the communication system 1000 includes a station device 1010 and an access point device 920.

Here, the station device 910 can be configured to implement the corresponding functions implemented by the station device in the above method, and the access point device 920 can be configured to implement the corresponding functions implemented by the access point device in the above method. For the sake of brevity, details thereof will be omitted here.

It is to be noted that the processor in the embodiment of the present disclosure may be an integrated circuit chip with signal processing capability. In an implementation, the steps of the above method embodiments can be implemented by hardware integrated logic circuits in a processor or instructions in the form of software. The processor can be a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component. The methods, steps, and logical block diagrams disclosed in the embodiments of the present disclosure can be implemented or performed. The general purpose processor may be a microprocessor or any conventional processor. The steps of the methods disclosed in the embodiments of the present disclosure may be directly embodied as being performed and completed by a hardware decoding processor, or by a combination of hardware and software modules in the decoding processor. The software modules can be located in a known storage medium in the related art, such as random access memory, flash memory, read-only memory, programmable read-only memory, electrically erasable programmable memory, or register. The storage medium can be located in the memory, and the processor can read information from the memory and perform the steps of the above methods in combination with its hardware.

It can be appreciated that the memory in the embodiments of the present disclosure may be a volatile memory or a non-volatile memory, or may include both volatile and non-volatile memories. Here, the non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. As illustrative, rather than limiting, examples, many forms of RAMs are available, including Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), and Direct Rambus RAM (DR RAM). It is to be noted that the memory used for the system and method described in the present disclosure is intended to include, but not limited to, these and any other suitable types of memories.

It can be appreciated that the above memories are exemplary only, rather than limiting the present disclosure. For example, the memory in the embodiment of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), or a Direct Rambus RAM (DR RAM). That is, the memory in the embodiments of the present disclosure is intended to include, but not limited to, these and any other suitable types of memories.

An embodiment of the present disclosure also provides a computer readable storage medium for storing a computer program.

In some embodiments, the computer readable storage medium can be applied to the access point device in the embodiment of the present disclosure, and the computer program can cause a computer to perform corresponding procedures implemented by the access point device in the method according to any of the embodiments of the present disclosure. Details thereof will be omitted here for simplicity.

In some embodiments, the computer readable storage medium can be applied to the station device in the embodiment of the present disclosure, and the computer program can cause a computer to perform corresponding procedures implemented by the station device in the method according to any of the embodiments of the present disclosure. Details thereof will be omitted here for simplicity.

An embodiment of the present disclosure also provides a computer program product including computer program instructions.

In some embodiments, the computer program product can be applied to the access point device in the embodiment of the present disclosure, and the computer program instructions can cause a computer to perform corresponding procedures implemented by the access point device in the method according to any of the embodiments of the present disclosure. Details thereof will be omitted here for simplicity.

In some embodiments, the computer program product can be applied to the station device in the embodiment of the present disclosure, and the computer program instructions can cause a computer to perform corresponding procedures implemented by the station device in the method according to any of the embodiments of the present disclosure. Details thereof will be omitted here for simplicity.

An embodiment of the present disclosure also provides a computer program.

In some embodiments, the computer program can be applied to the access point device in the embodiment of the present disclosure. The computer program, when executed on a computer, can cause the computer to perform corresponding procedures implemented by the access point device in the method according to any of the embodiments of the present disclosure. Details thereof will be omitted here for simplicity.

In some embodiments, the computer program can be applied to the station device in the embodiment of the present disclosure. The computer program, when executed on a computer, can cause the computer to perform corresponding procedures implemented by the station device in the method according to any of the embodiments of the present disclosure. Details thereof will be omitted here for simplicity.

It can be appreciated by those skilled in the art that units and algorithm steps in the examples described in connection with the embodiments disclosed herein can be implemented in electronic hardware or any combination of computer software and electronic hardware. Whether these functions are executed by hardware or software depends on specific applications and design constraint conditions of the technical solutions. Those skilled in the art may use different methods for each specific application to implement the described functions, and such implementation is to be encompassed by the scope of this disclosure.

Those skilled in the art can clearly understand that, for the convenience and conciseness of the description, for the specific operation processes of the systems, devices, and units described above, reference can be made to the corresponding processes in the foregoing method embodiments, and details thereof will be omitted here.

In the embodiments of the present disclosure, it can be appreciated that the disclosed systems, devices, and methods may be implemented in other ways. For example, the device embodiments described above are illustrative only. For example, the divisions of the units are only divisions based on logical functions, and there may be other divisions in actual implementations. For example, more than one unit or component may be combined or integrated into another system, or some features can be ignored or omitted. In addition, the mutual coupling or direct coupling or communicative connection as shown or discussed may be indirect coupling or communicative connection between devices or units via some interfaces which may be electrical, mechanical, or in any other forms.

The units described as separate components may or may not be physically separated, and the components shown as units may or may not be physical units, that is, they may be co-located or distributed across a number of network elements. Some or all of the units may be selected according to actual needs to achieve the objects of the solutions of the embodiments.

In addition, the functional units in the embodiments of the present disclosure may be integrated into one processing unit, or alternatively be separate physical modules, or two or more units may be integrated into one unit.

When the function is implemented in the form of a software functional unit and sold or used as a standalone product, it can be stored in a computer readable storage medium. Based on this understanding, all or part of the technical solutions according to the embodiments of the present disclosure, or the part thereof that contributes to the prior art, can be embodied in the form of a software product. The computer software product may be stored in a storage medium and contain instructions to enable a computer device, such as a personal computer, a server, or a network device, etc., to perform all or part of the steps of the method described in each of the embodiments of the present disclosure. The storage medium may include a Universal Serial Bus flash drive, a mobile hard disk, a Read-Only Memory (ROM), a Random Access Memory (RAM), a magnetic disk, an optical disc, or any other medium capable of storing program codes.

While the specific embodiments of the present disclosure have been described above, the scope of the present disclosure is not limited to these embodiments. Various variants and alternatives can be made by those skilled in the art without departing from the scope of the present disclosure. These variants and alternatives are to be encompassed by the scope of the present disclosure as defined by the claims as attached.

What is claimed is:

1. A wireless communication method, comprising:
   transmitting, by a Master Access Point (MAP) device, first information, wherein
   the first information comprises identifiers of Access Points (APs) or an identifier of an AP group for multi-AP coordinated transmission with a Station (STA) device;
   transmitting, by the MAP device, sixth information to at least one slave AP (SAP) device, wherein the sixth information comprises a field indicating a supported type of multi-AP coordinated transmission transmitted via a request frame; and
   receiving, by the MAP device, seventh information carrying confirmation feedback information for the sixth information from the at least one SAP device, the seventh information being transmitted via a response frame;
   wherein the field indicating the supported type of multi-AP coordinated transmission comprises a coordinated spatial reuse (C-SR) subfield and a coordinated beamforming (C-BF subfield;
   wherein the C-SR subfield occupies 1 bit and/or the C-BF subfield occupies 1 bit.

2. The method according to claim 1, wherein the C-SR subfield is a second subfield of the field indicating the supported type of multi-AP coordinated transmission.

3. The method according to claim 1, wherein the C-BF subfield is a third subfield of the field indicating the supported type of multi-AP coordinated transmission.

4. The method according to claim 1, wherein the C-BF subfield is located immediately after the C-SR subfield.

5. The method according to claim 1, wherein the C-SR subfield occupies a second bit of the field indicating the supported type of multi-AP coordinated transmission.

6. The method according to claim 1, wherein the C-BF subfield occupies a third bit of the field indicating the supported type of multi-AP coordinated transmission.

7. The method according to claim 1, wherein a last subfield of the field indicating the supported type of multi-AP coordinated transmission is a subfield of reserved bits.

8. The method according to claim 7, wherein the field indicating the supported type of multi-AP coordinated transmission further comprises:

a coordinated orthogonal frequency division multiple access (C-OFDMA) subfield, a joint transmission (J-TX) subfield, and an uplink multi user multiple input multiple output (UL-MU MIMO) subfield.

9. The method according to claim 1, wherein the at least one SAP is in a coverage of the MAP device.

10. The method according to claim 1, further comprising:

exchanging, by the MAP device, twelfth information with the at least one SAP device, the twelfth information comprising multi-AP transmission capability information;

wherein the twelfth information is transmitted via a beacon frame, the beacon frame comprising at least the multi-AP transmission capability information, the multi-AP transmission capability information comprising a multi-AP transmission capability field;

wherein the multi-AP transmission capability information comprises:

a C-OFDMA subfield, a C-SR subfield, a C-BF subfield, a J-TX subfield, an UL-MU MIMO subfield, and a reserved subfield.

11. An access point device which is a Master Access Point (MAP) device, comprising a processor and a memory, wherein the memory is configured to store a computer program, and the computer program, when executed by the processor enables the MAP device to perform:

transmitting first information, wherein the first information comprises identifiers of Access Points (APs) or an identifier of an AP group for multi-AP coordinated transmission with a Station (STA) device;

transmitting sixth information to at least one slave AP (SAP) device, wherein the sixth information comprises a field indicating a supported type of multi-AP coordinated transmission transmitted via a request frame; and receiving seventh information carrying confirmation feedback information for the sixth information from the at least one SAP device, the seventh information being transmitted via a response frame;

wherein the field indicating the supported type of multi-AP coordinated transmission comprises a coordinated spatial reuse (C-SR) subfield and a coordinated beamforming (C-BF) subfield;

wherein the C-SR subfield occupies 1 bit and/or the C-BF subfield occupies 1 bit.

12. The access point device according to claim 11, wherein the C-SR subfield is a second subfield of the field indicating the supported type of multi-AP coordinated transmission.

13. The access point device according to claim 11, wherein the C-BF subfield is a third subfield of the field indicating the supported type of multi-AP coordinated transmission.

14. The access point device according to claim 11, wherein the C-BF subfield is located immediately after the C-SR subfield.

15. The access point device according to claim 11, wherein the C-SR subfield occupies a second bit of the field indicating the supported type of multi-AP coordinated transmission.

16. The access point device according to claim 11, wherein the C-BF subfield occupies a third bit of the field indicating the supported type of multi-AP coordinated transmission.

17. The access point device according to claim 11, wherein a last subfield of the field indicating the supported type of multi-AP coordinated transmission is a subfield of reserved bits.

18. The access point device according to claim 17, wherein the field indicating the supported type of multi-AP coordinated transmission further comprises:

a coordinated orthogonal frequency division multiple access (C-OFDMA) subfield, a joint transmission (J-TX) subfield, and an uplink multi user multiple input multiple output (UL-MU MIMO) subfield.

19. The access point device according to claim 11, wherein the at least one SAP is in a coverage of the MAP device.

20. The access point device according to claim 11, wherein the computer program, when executed by the processor, enables the MAP device to perform:

exchanging twelfth information with the at least one SAP device, the twelfth information comprising multi-AP transmission capability information;

wherein the twelfth information is transmitted via a beacon frame, the beacon frame comprising at least the multi-AP transmission capability information, the multi-AP transmission capability information comprising a multi-AP transmission capability field;

wherein the multi-AP transmission capability information comprises:

a C-OFDMA subfield, a C-SR subfield, a C-BF subfield, a J-TX subfield, an UL-MU MIMO subfield, and a reserved subfield.

* * * * *